US011131371B2

(12) United States Patent
Kang et al.

(10) Patent No.: US 11,131,371 B2
(45) Date of Patent: Sep. 28, 2021

(54) DRIVING APPARATUS FOR ELECTRIC VEHICLE

(71) Applicant: LG ELECTRONICS INC., Seoul (KR)

(72) Inventors: Joohang Kang, Seoul (KR); Youngchan Ahn, Seoul (KR); Junggu Lee, Seoul (KR)

(73) Assignee: LG ELECTRONICS, Seoul (KR)

( * ) Notice: Subject to any disclaimer, the term of this patent is extended or adjusted under 35 U.S.C. 154(b) by 73 days.

(21) Appl. No.: 16/658,491

(22) Filed: Oct. 21, 2019

(65) Prior Publication Data

US 2020/0200247 A1 Jun. 25, 2020

(30) Foreign Application Priority Data

Dec. 20, 2018 (KR) .................. 10-2018-0166080
Jan. 23, 2019 (KR) .................. 10-2019-0008834

(51) Int. Cl.
| *B60K 6/365* | (2007.10) |
| *F16H 37/04* | (2006.01) |
| *B60K 1/00* | (2006.01) |
| *B60K 17/16* | (2006.01) |
| *F16H 1/36* | (2006.01) |
| *F16H 57/02* | (2012.01) |

(52) U.S. Cl.
CPC ............. *F16H 37/041* (2013.01); *B60K 1/00* (2013.01); *B60K 17/165* (2013.01); *F16H 1/36* (2013.01);
(Continued)

(58) Field of Classification Search
CPC .......... F16H 37/041; F16H 1/36; F16H 57/02; F16H 2057/02043; F16H 2702/02;
(Continued)

(56) References Cited

U.S. PATENT DOCUMENTS 5,807,205 A * 9/1998 Odaka ...................... B60L 7/00
477/29
8,640,801 B2 * 2/2014 Hennings ............. B60K 7/0007
180/65.6
(Continued)

FOREIGN PATENT DOCUMENTS

DE 102013016441 4/2015
DE 102015213146 1/2017
(Continued)

OTHER PUBLICATIONS

Korean Notice of Allowance dated Aug. 21, 2020.
KR Notice of Allowance dated Jul. 15, 2020.
European Search Report dated Mar. 20, 2020.

*Primary Examiner* — Justin Holmes
(74) *Attorney, Agent, or Firm* — Finnegan, Henderson, Farabow, Garrett & Dunner, LLP

(57) ABSTRACT

A driving apparatus for an electric vehicle includes a housing, a driving motor, and a planetary gear unit. The planetary gear unit includes a ring gear fixed to the housing and a plurality of planetary gears positioned radially inward from the ring gear. The ring gear includes a ring gear main body configured as a ring-shaped flat plate extending in a radial direction, and a ring gear connection portion extending from an outer peripheral surface of the ring gear main body in an axial direction and contacting the plurality of planetary gears.

19 Claims, 17 Drawing Sheets

(52) U.S. Cl.
CPC .............. *F16H 57/02* (2013.01); *B60K 6/365* (2013.01); *B60Y 2200/91* (2013.01); *B60Y 2200/92* (2013.01); *B60Y 2400/73* (2013.01); *B60Y 2400/80* (2013.01); *F16H 2057/02043* (2013.01); *F16H 2702/02* (2013.01)

(58) Field of Classification Search
CPC ........ B60K 1/00; B60K 17/165; B60K 6/365; B60K 2001/001; B60Y 2200/91; B60Y 2200/92; B60Y 2400/73; B60Y 2400/80
See application file for complete search history.

(56) References Cited

U.S. PATENT DOCUMENTS

| | | | |
|---|---|---|---|
| 2011/0218070 A1 | 9/2011 | Mack et al. | |
| 2012/0258831 A1* | 10/2012 | Knoblauch | B60K 6/52 475/5 |
| 2018/0112755 A1* | 4/2018 | Littlefield | F16H 37/0813 |

FOREIGN PATENT DOCUMENTS

| | | | | |
|---|---|---|---|---|
| DE | 102018101408 | | 10/2018 | |
| EP | 2821672 | | 1/2015 | |
| JP | 2000035092 | | 2/2000 | |
| JP | 2003-127680 | | 5/2003 | |
| JP | 2003127683 | | 5/2003 | |
| JP | 2005-29117 | | 2/2005 | |
| JP | 2005320998 | | 11/2005 | |
| JP | 2009121549 | | 6/2009 | |
| JP | 2010090587 | | 4/2010 | |
| JP | 2010168035 | | 8/2010 | |
| JP | 2010263761 | | 11/2010 | |
| JP | 2012241770 | | 12/2012 | |
| JP | 2016166658 | | 9/2016 | |
| KR | 10-2011-0138774 | | 12/2011 | |
| KR | 101374872 | | 3/2014 | |
| WO | WO 2005/005167 | | 1/2005 | |
| WO | WO-2012159789 A1 | * | 11/2012 | ................ B60L 9/16 |

* cited by examiner

DRIVING APPARATUS FOR ELECTRIC VEHICLE

CROSS-REFERENCE TO RELATED APPLICATIONS

Pursuant to 35 U.S.C. § 119(a), this application claims the benefit of earlier filing dates of and the right of priority to Korean Applications Nos. 10-2018-0166080, filed on Dec. 20, 2018, and 10-2019-0008834, filed on Jan. 23, 2019, the contents of both of which are incorporated by reference herein in their entireties.

BACKGROUND

The present disclosure relates to a driving apparatus for an electric vehicle.

In recent years, the development of electric vehicles using electric power as a power source has been promoted by replacing vehicles using petroleum as a power source which causes pollution. In addition, a hybrid vehicle using petroleum and electric power as a power source is being developed.

Since the hybrid vehicle uses electric power as one of the power sources, the hybrid vehicle can be classified as one type of electric vehicle. In other words, it can be understood that the electric vehicle described below includes the hybrid vehicle.

The electric vehicle includes a battery for supplying electric power and a driving apparatus for an electric vehicle (hereinafter, referred to as a driving apparatus) that is operated by the battery to rotate an axle. In addition, the driving apparatus includes a driving motor which generates power through the electric power supplied from the battery and a gearbox which connects the driving motor and the axle.

The gearbox can be understood as an apparatus for decelerating or shifting the power transmitted from the driving motor to transmit the power to the axle. Specifically, the power generated by the driving motor is transmitted to the gearbox, and the power transmitted from the gearbox is decelerated or shifted to be transmitted to the axle.

With respect to such a driving apparatus for an electric vehicle, the following related art documents have been disclosed.

1. German Published Patent: DE10-2013-016441A1 (public date: Apr. 2, 2015)

2. Title of the invention: A device for driving a vehicle

This related art document relates to an apparatus for driving a vehicle, that is, a vehicle driving apparatus. In addition, the driving apparatus for a vehicle includes a driving motor and a gearbox and can be understood as a driving apparatus for an electric vehicle.

In addition, the gearbox provided in the related art document includes a differential gear disposed inside the driving motor and a planetary gear disposed on one side of the driving motor and transmitting power to the differential gear.

In the related art documents, the planetary gear is provided in a state of being directly fixed to the inside of the case forming the outer appearance thereof. Accordingly, there is a problem that the vibration generated in the gearbox is easily transmitted to the outside through the case according to the operation of the driving motor. In other words, the vibration of the driving apparatus is easily transmitted to the outside, which causes a lot of vibration and noise in the driving apparatus.

Further, there is a problem that the planetary gears have a relatively large number of configurations, and the structure thereof is complicated and difficult to implement. In other words, a relatively large material cost is required and it is difficult to secure price competitiveness of the driving apparatus. In addition, there is a problem that the manufacturing cost and manufacturing time are relatively increased.

Further, the related art documents disclose a feature in which a differential gear, which is a component of the gearbox, is disposed inside the driving motor. The planetary gear which transmits power to the differential gear is disposed outside the driving motor. Thereby, a structure for transmitting power from the planetary gear to the differential gear is required. However, the related art documents do not disclose such a configuration in detail, and thus there is a problem that transmission of power cannot be grasped.

Further, the differential gear is rotated differently from the driving motor on the power transmission path. Therefore, a structure for supporting the differential gear so as to be separated from the driving motor is required, but there is a problem that the related art documents do not have a structure related thereto.

Generally, a pair of shafts may be provided for supporting both sides of the differential gear so as to support the differential gears apart from the driving motor. At this time, any one of the pair of shafts may function as a shaft (hereinafter referred to as a power input shaft) for transmitting power from the planetary gear to the differential gear. The other one of the pair of shafts functions as a shaft (hereinafter referred to as a support shaft) for supporting the differential gear. One end of the support shaft is coupled to the differential gear, and the other end thereof is rotatably fixed by a bearing. In other words, the support shaft has a structure in which the differential gear is simply fixed and has a problem in that it is not necessary for terms of power transmission.

In other words, there is a problem that the structure of the driving apparatus is complicated because the supporting shaft and the bearing for fixing the supporting shaft, which is unnecessary structures in terms of power transmission, are provided. In addition, there is a problem that the volume of the driving apparatus is larger and a lot of installation space is required.

SUMMARY

The present disclosure has been proposed so as to solve such problems, and an objective of the present disclosure is to provide a driving apparatus for an electric vehicle including a ring gear coupled to a housing forming an outer appearance thereof so as to increase a path through which vibration is transmitted and thus reduce the vibration transmitted to the outside.

In addition, an objective of the present disclosure is to provide a driving apparatus of an electric vehicle in which a separate configuration for fixing a rotor shaft bearing is omitted as the ring gear is coupled to the housing to fix the rotor shaft bearing.

In other words, the ring gear functions as one configuration of the gearbox which transmits the power of the driving motor, and also functions to fix the rotor shaft bearing. Therefore, an objective of the present disclosure is to provide a driving apparatus for an electric vehicle which performs two functions in one configuration.

In addition, the present disclosure has been proposed so as to solve such problems, and an objective of the present disclosure is to provide a driving apparatus for an electric vehicle in which vibrations of a power input shaft, provided in the form of a cantilever, for transmitting power of a planetary gear and supporting a differential gear are reduced.

Particularly, an objective of the present disclosure is to provide a driving apparatus for an electric vehicle in which since the power input shaft is provided only on one side of the differential gear, and the support shaft, which is an unnecessary configuration, is omitted and the volume thereof is reduced.

In addition, an objective of the present disclosure is to provide a driving apparatus for an electric vehicle having a power transmission structure in which the power is first reduced in the planetary gear and transmitted to the differential gear, and is transmitted from the differential gear to the reduction gear to be secondarily reduced.

Therefore, an objective of the present disclosure is to provide a driving apparatus for an electric vehicle capable of minimizing the volume of a driving motor in which the differential gear is disposed therein as the volume of the differential gear becomes relatively small and the volume of the driving motor becomes small.

In addition, an objective of the present disclosure is to provide a driving apparatus for an electric vehicle in which the volume of a battery can be maximized in the same installation space as the volume of the driving motor is minimized. As a result, an objective of the present disclosure is to provide a driving apparatus for an electric vehicle in which an electric vehicle can be operated more efficiently as the volume of the battery is maximized.

A driving apparatus for an electric vehicle according to an idea of the present disclosure includes a housing, a driving motor disposed inside the housing, and a planetary gear unit located inside the housing and disposed on one side of the driving motor in the axial direction.

The planetary gear unit includes a ring gear fixed to the housing and a plurality of planetary gears positioned inward of the ring gear in the radial direction.

The ring gear includes a ring gear main body provided in a ring-shaped flat plate extending in the radial direction, and a ring gear connection portion extending axially from the outer peripheral surface of the ring gear main body and being in contact with the plurality of planetary gears.

In addition, the planetary gear unit further includes a carrier connected to the planetary gear so as to transmit the driving force of the planetary gear to the differential gear unit. The carrier includes a carrier main body provided in a ring-shaped flat plate extending in a radial direction.

The outer diameter of the ring gear main body may be larger than the outer diameter of the carrier main body.

In addition, the ring gear further includes a ring gear penetrating opening formed in the ring gear main body so that a ring gear fastening member coupling with the housing is inserted.

The ring gear penetrating opening may be positioned inward of the outer peripheral surface of the carrier main body in the radial direction.

In addition, the driving apparatus of an electric vehicle according to an idea of the present disclosure includes a differential gear case embedded in a driving motor.

Particularly, the differential gear case is disposed such that one side is supported inside the driving motor. More specifically, the power input shaft supports the differential gear case at one side, and the differential gear case has an asymmetric support structure. The power input shaft corresponds to a cantilever having a free end and a fixed end in terms of vibration.

Accordingly, a driving apparatus for an electric vehicle according to an embodiment of the present disclosure includes a driving motor, a planetary gear unit which receives power from the driving motor, and a differential gear unit which receives power from the planetary gear unit.

In addition, the differential gear unit includes a differential gear case disposed to be spaced apart from the inside of the driving motor, and a power input shaft connecting the differential gear case to the planetary gear unit.

The power input shaft is provided in a form of a cantilever including a free end coupled to the differential gear case and a fixed end fixedly coupled with the planetary gear unit.

A support shaft supporting the other side of the differential gear case is omitted so that the differential gear case has an asymmetric support structure.

Accordingly, the driving apparatus of an electric vehicle according to an embodiment of the present disclosure includes a rotor, a rotor shaft extending in both axial directions in the rotor and a differential gear case disposed inward of the rotor in the radial direction. The rotor and the rotor shaft correspond to a configuration included in the driving motor.

In addition, the driving apparatus of an electric vehicle includes a first differential shaft which extends from the differential gear case to one side in the axial direction, along with an inside of the rotor shaft in the radial direction; a second differential shaft which extends from the differential gear case to the other side in the axial direction, along with an inside of the rotor shaft in the radial direction; and a power input shaft which supports the differential gear case so that the differential gear case is spaced apart from the rotor.

The power input shaft is disposed between the rotor shaft and the first differential shaft, and an empty space is formed between the rotor shaft and the second differential shaft.

By the present disclosure according to the solution means, the ring gear is coupled to a case extending portion extending from an inner surface of a housing forming an outer appearance to an inside thereof in the radial direction to increase a path through which vibration is transmitted and thus reduce the vibration transmitted to the outside.

In addition, since the ring gear is formed to extend in the radial direction and the axial direction, there is an advantage that it is possible to change the transmission path of the vibration through the ring gear to reduce the vibration transmitted to the outside.

Further, since the rotor shaft bearing is fixed between the ring gear and the case extending portion, there is an advantage that a separate configuration for fixing the rotor shaft bearing can be omitted and the planetary gear unit can be formed in a simple structure.

Further, the ring gear functions as one configuration of a gearbox that transmits power of the driving motor, and at the same time, functions to fix the rotor shaft bearing. Therefore, there is an advantage that two functions can be performed in one configuration.

In addition, since a separate configuration for fixing the rotor shaft bearing is omitted, there is an advantage that the overall volume of the planetary gear unit is reduced. In addition, there is an advantage that the size of the driving apparatus of an electric vehicle including the planetary gear unit can be entirely reduced.

Further, since the size of the driving apparatus of an electric vehicle is reduced within the same installation space, there is an advantage that the size (capacity) of the battery installed together with the driving apparatus of an electric vehicle can be accommodated more. Since the size (capacity) of the battery increases, there is an advantage that the efficiency of the electric vehicle can be increased.

In addition, by the present disclosure according to the solution means, since the differential gear case disposed inside the driving motor is supported on one side, an unnecessary support structure can be omitted.

Specifically, a power input shaft provided in a form of a cantilever is supported on one side of the differential gear case in the axial direction so that the rotor shaft of the driving motor and the differential gear case are spaced apart from each other. Therefore, a supporting structure is not required on the other side of the differential gear case in the axial direction, and there is an advantage that the supporting structure can be omitted.

Further, since the structure for supporting both sides is omitted, there is an advantage that the volume of the driving apparatus can be reduced.

In addition, since the volume of the driving motor is reduced, there is an advantage that an installation space of the battery can be secured to be wider in the same installation space. As a result, there is an advantage that the efficiency of the electric vehicle can be increased.

In addition, there is an advantage that vibration of the power input shaft provided in the form of a cantilever can be reduced by installing a vibration reduction bearing.

Further, since the vibration of the power input shaft is reduced, there is an advantage that interference with other components such as the differential shaft and the rotor shaft can be prevented. Accordingly, there is an advantage that wear and breakage of the components can be prevented and the breakdown of the driving apparatus can be prevented.

DETAILED DESCRIPTION OF THE EMBODIMENTS

Figure 1:
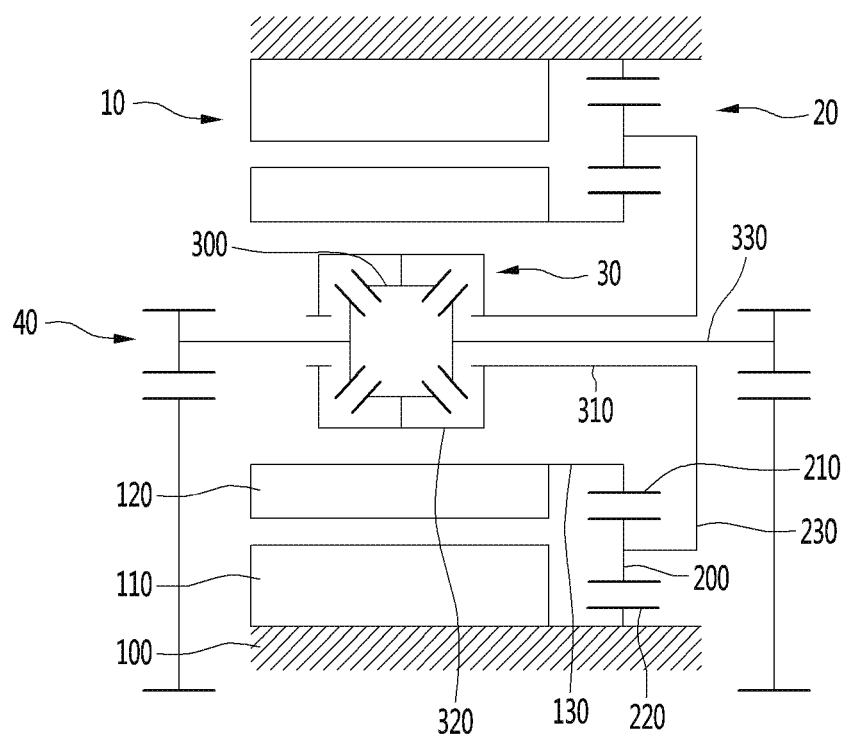
FIG. 1 is a schematic view illustrating a driving apparatus for an electric vehicle according to an embodiment of the present disclosure.

Hereinafter, some embodiments of the present disclosure will be described in detail with reference to exemplary drawings. It should be noted that, in adding reference numerals to the constituent elements of the drawings, the same constituent elements are denoted by the same reference numerals even though they are illustrated in different drawings. In addition, in the following description of the embodiments of the present disclosure, a detailed description with respect to known configurations or functions incorporated herein will be omitted in a case where it is determined that the understanding thereof is obstructed.

Also, terms such as first, second, A, B, (a), (b) or the like may be used herein when describing components of the present disclosure. These terms are intended only to distinguish the components from the other components and are not limit an essence, order, sequence, or the like of a corresponding component. It should be understood that if it is described in the specification that one component is "connected," "coupled", or "joined" to another component, the one component may be directly "connected," "coupled," or "joined" to the another component, but another component may be "connected", "coupled", or "joined" between components.

FIG. 1 is a schematic view illustrating a driving apparatus for an electric vehicle according to an embodiment of the present disclosure.

As illustrated in FIG. 1, a driving apparatus for an electric vehicle 1 (hereinafter referred to as driving apparatus) according to the idea of the present disclosure includes a driving motor 10 and a gearbox. The gearbox can be understood as a configuration for transmitting the driving force of the driving motor 10 to the axle.

The gearbox may include a planetary gear unit 20, a differential gear unit 30, and a reduction gear unit 40. The power generated by the driving motor 10 may be transmitted to the axle along the planetary gear unit 20, the differential gear unit 30, and the reduction gear unit 40.

In this case, in the driving apparatus 1 according to the idea of the present disclosure, the differential gear unit 30 is disposed inside the driving motor 10. In addition, the planetary gear unit 20 is disposed on one side of the driving motor 10 and the reduction gear unit 40 is disposed on both sides of the driving motor 10 and connected to the axle, respectively.

More specifically, the driving motor 10 includes a stator 110 and a rotor 120 disposed inside the stator 110. The stator 110 is fixedly disposed on the housing 100, and the rotor 120 is rotatably disposed. When electric power is applied to the stator 110, the rotor 120 may be rotated by an electromagnetic force.

The stator 110 and the rotor 120 are provided in a cylindrical shape having a hollow inside. Specifically, the stator 110 and the rotor 120 are opened inward in the axial direction (transverse direction in FIG. 1). The rotor 120 is disposed inward of the stator 110 in the radial direction and the differential gear unit 30 is disposed inward of the rotor 120 in the radial direction.

Also, the driving motor 10 includes a rotor shaft 130 extending from the rotor 120. The rotor shaft 130 may be understood as a configuration which connects the rotor 120 and the planetary gear unit 20 to each other. In particular, the rotor shaft 130 may be a hollow shaft and may be rotated together with the rotor 120.

The planetary gear unit 20 includes a sun gear 210, a planetary gear 200, a ring gear 220, and a carrier 230. The sun gear 210 is connected to the rotor shaft 130 and the carrier 230 is connected to the differential gear unit 30.

The planetary gear 200 is connected to the sun gear 210 and the carrier 230. In detail, the planetary gear 200 may be disposed on the outer peripheral surface of the sun gear 210 and interlocked with the sun gear 210.

In particular, a plurality of the planetary gears 200 are provided, and the plurality of planetary gears 200 may be disposed at equal intervals in the peripheral direction. For example, three planetary gears 200 may be disposed on the outer peripheral surface of the sun gear 210 in a state of being spaced apart from each other by 120 degrees.

The ring gear 220 is provided in a state of being fixed to the housing 100. The ring gear 220 can be understood as a configuration for fixing the planetary gear 200 so that the planetary gear 200 can be rotated within a predetermined range.

Accordingly, power is transmitted from the driving motor 10 to the sun gear 210, the planetary gear 200, and the carrier 230. Particularly, when the rotor shaft 130 rotates, the sun gear 210 rotates. The planetary gear 200 rotates to be interlocked with the sun gear 210 and revolves along the inner peripheral surface of the ring gear 220. The carrier 230 may be rotated by revolving the plurality of planetary gears 200.

The differential gear unit 30 includes a power input shaft 310, a differential gear case 320, a differential gear 300, and a differential shaft 330. It is understood that the power input shaft 310 is connected to the carrier 230 and the differential shaft 330 is connected to the reduction gear unit 40. The differential gear case 320 and the differential gear 300 correspond to a configuration which connects the power input shaft 310 and the differential shaft 330 to each other.

Accordingly, the power is transmitted from the planetary gear unit 20 to the power input shaft 310, the differential gear case 320, the differential gear 300, and the differential shaft 330. The differential shafts 330 extend to both sides in the axial direction, respectively and are connected to the reduction gear unit 40, respectively. The reduction gear unit 40 may be connected to an axle.

Hereinafter, each configuration will be described in detail with reference to drawings of a specific driving apparatus.

Figure 2:
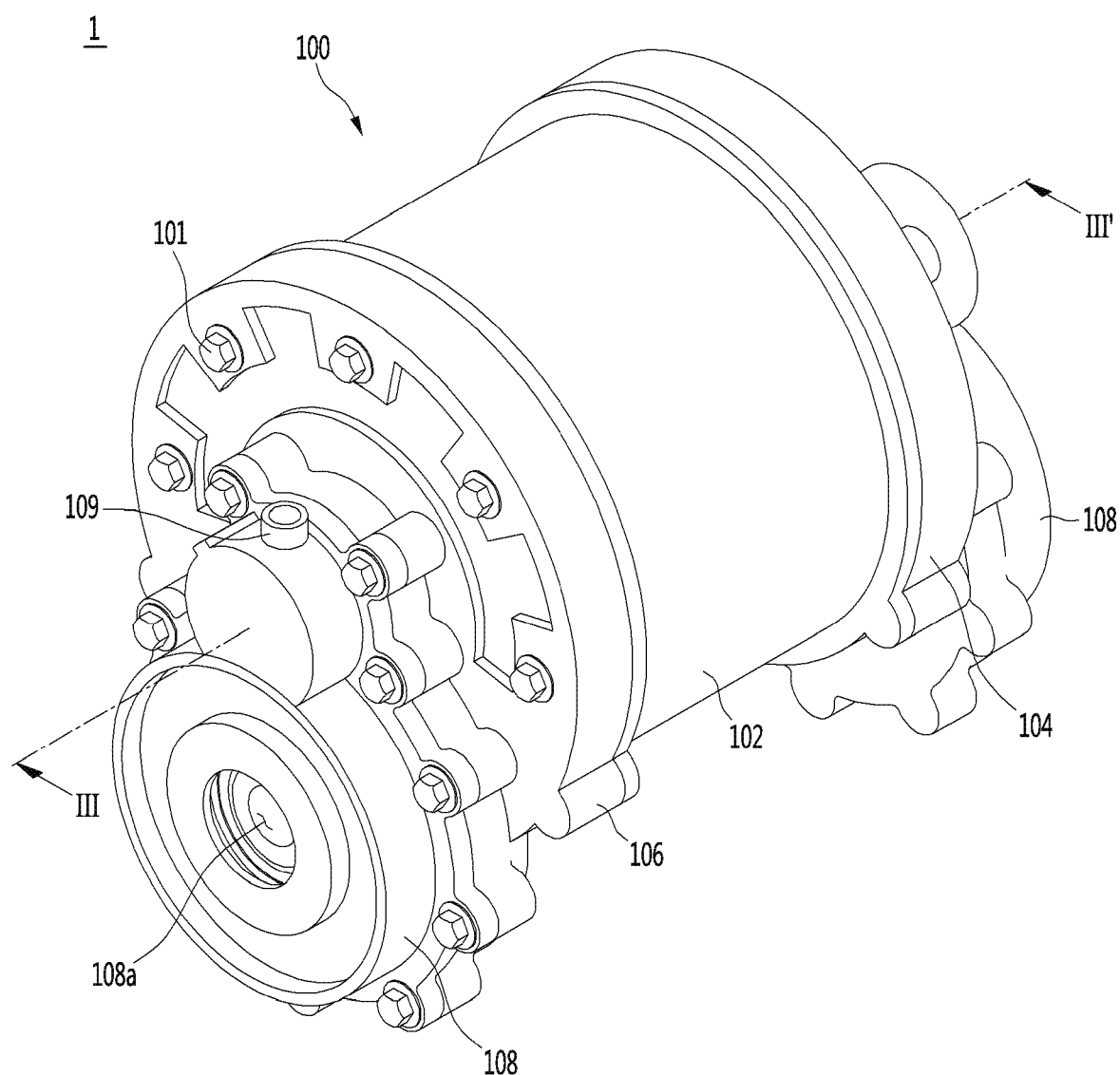
FIG. 2 is a view illustrating an outer appearance of a driving apparatus for an electric vehicle according to an embodiment of the present disclosure.

FIG. 2 is a view illustrating the outer appearance of a driving apparatus for an electric vehicle according to an embodiment of the present disclosure.

As illustrated in FIG. 2, the driving apparatus 1 includes a housing 100 forming an outer appearance. In the interior of the housing 100, the above-described construction such as the driving motor 10, and the gearbox is arranged. Some configuration such as the stator 110 and the ring gear 220 may be fixed to the inside of the housing 100.

The housing 100 includes a plurality of covers 102, 104, 106, and 108 coupled to each other. The plurality of covers 102, 104, 106 and 108 are aligned in the axial direction and can be coupled to each other through a plurality of fastening members 101.

The plurality of covers include a motor case 102 for housing the driving motor 10, intermediate covers 104 and 106 coupled to both sides of the motor case 102, and a case cover 108, which is coupled to the sides of the intermediate covers 104 and 106, respectively.

The intermediate cover may be divided into a first intermediate cover 104 coupled to one side of the motor case 102 and a second intermediate cover 106 coupled to the other side of the motor case 102. The first intermediate cover 104 is disposed on one side on which the planetary gear unit 20 is disposed, and the second intermediate cover 106 is disposed on the other side on which the planetary gear unit 20 is not disposed.

The case covers 108 are coupled to the first intermediate cover 104 and the second intermediate cover 106, respectively. Since the case covers 108 are formed in the same manner, the case cover 108 is not distinguished for the convenience of explanation.

The case cover 108 is formed with a case cover through-hole 108a to which an axle is coupled. The axle extends through the case cover through-hole 108a into the driving apparatus 1 and can be engaged with the reduction gear 40. In addition, the case cover 108 may be provided with an oil injection port 109 through which oil can be injected into the driving apparatus 1.

Hereinafter, configurations which are disposed in the housing 100 will be described in detail.

FIGS. 3 to 9 relate to a driving apparatus for an electric vehicle according to the first embodiment.

Figure 3:
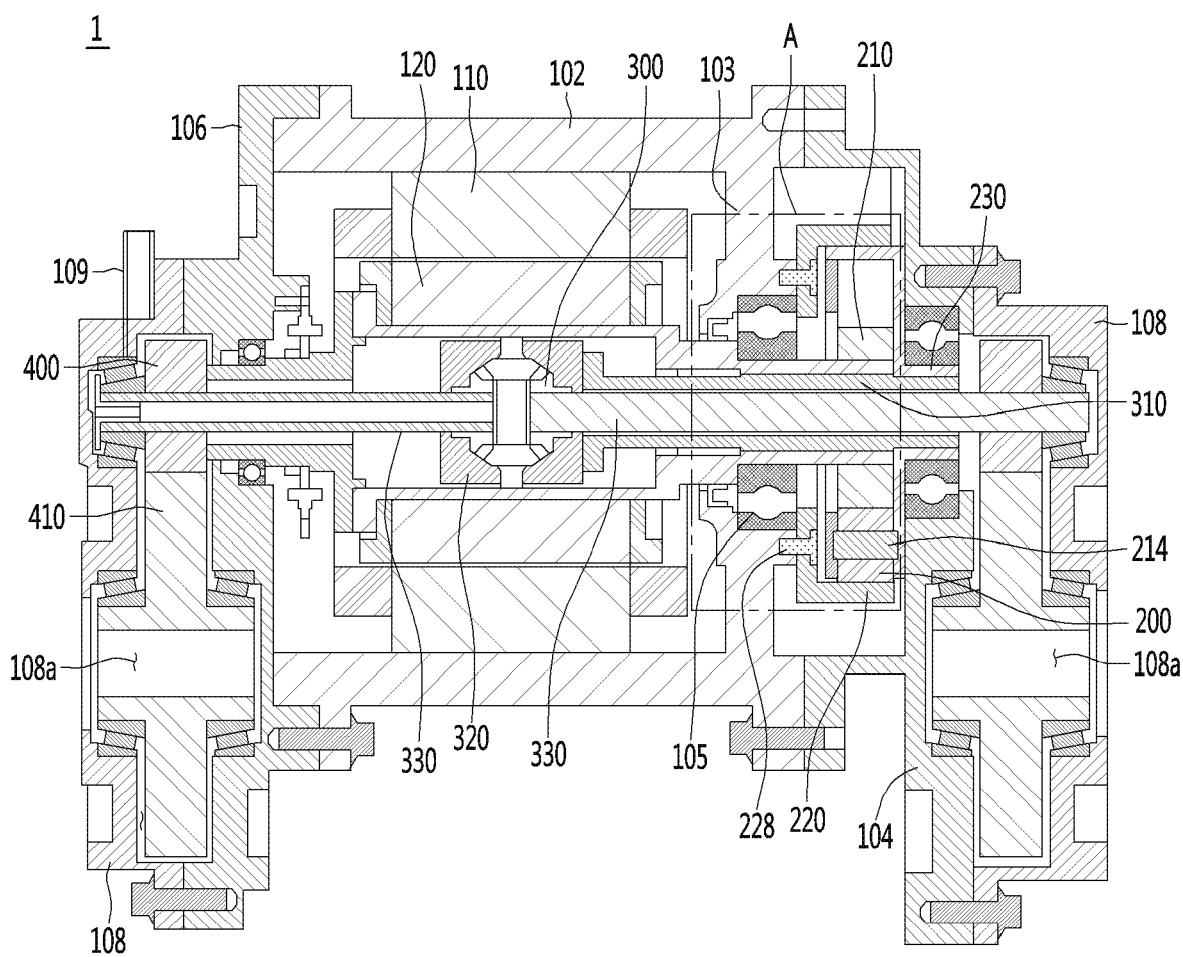
FIG. 3 is a sectional view taken along line III-III' of FIG. 2 according to the first embodiment of the present disclosure.

FIG. 3 is a sectional view taken along line III-III' of FIG. 2 according to the first embodiment of the present disclosure.

As illustrated in FIG. 3, the driving motor 10, the planetary gear unit 20, the differential gear unit 30, and the reduction gear unit 40 are disposed in the housing 100.

The driving motor 10 includes the stator 110 and the rotor 120. The stator 110 is fixed to the inside of the motor case 102 and the rotor 120 is rotatably disposed inside the stator 110.

In addition, the rotor 120 is coupled to the rotor shaft 130. The rotor shaft 130 extends axially toward the middle covers 104 and 106. Particularly, at least a portion of the rotor shaft 130 extending toward a side of the first intermediate cover 104 can be interlocked with the planetary gear unit 20.

The planetary gear unit 20 includes the sun gear 210, the planetary gear 200, the ring gear 220, and the carrier 230. As illustrated in FIG. 3, the sun gear 210 is coupled to the outside of the rotor shaft 130. Accordingly, the sun gear 210 can be rotated together with the rotation of the rotor shaft 130.

Further, the ring gear 220 is disposed between the first intermediate cover 104 and the motor case 102. As illustrated in FIG. 3, the ring gear 220 may be coupled to one side of the motor case 102 and fixed thereto. The shape and arrangement of the ring gear 220 will be described later in detail.

The planetary gear 220 is disposed between the sun gear 210 and the ring gear 220. FIG. 3 illustrates one end surface of the driving apparatus 1, only one planetary gear 220 is illustrated, but a plurality of the planetary gears 220 may be provided (see FIG. 5).

In addition, the carrier 230 is engaged with the planetary gear 220 and rotated together with the planetary gear. The differential gear unit 30 is coupled to the center of the carrier 230. Accordingly, the carrier 230 and the differential gear unit 30 can be interlocked with each other.

The differential gear unit 30 includes the power input shaft 310, the differential gear case 320, the differential gear 300, and the differential shaft 330. As illustrated in FIG. 3, the differential gear case 320 and the differential gear 300 are disposed inside the rotor 120.

Accordingly, the power input shaft 310 extends axially from one side of the rotor 120 to the inside of the rotor 120. More specifically, one end of the power input shaft 310 is coupled to the carrier 230, and the other end thereof is coupled to the differential gear case 320.

Further, the differential shaft 330 extends outwardly from the inside of the rotor 120. A pair of the differential shafts 330 which extend in both axial directions is provided. The differential shaft 330 may be engaged with the reduction gear unit 40 and interlocked with each other. The power input shaft 310 is provided as a hollow shaft so that the differential shaft 330 can be disposed inside.

The reduction gear unit 40 includes a first reduction gear 400 coupled to the differential shaft 330 and a second reduction gear 410 interlocked with the first reduction gear 400. The number of gear teeth of the second reduction gear 410 may be larger than the number of gear teeth of the first reduction gear 400. Accordingly, the power may be decelerated in the process of being transmitted from the first reduction gear 400 to the second reduction gear 410.

In addition, the driving apparatus 1 is provided with a rotor shaft bearing 105 for rotatably fixing the rotor shaft 130. The rotor shaft bearing 105 is coupled outward of the rotor shaft 130 in the radial direction. Further, the rotor shaft bearing 105 is disposed between the rotor 120 and the planetary gear unit 20 in the radial direction.

In addition, the motor case 102 includes a case extending portion 103 extending radially inward so that the rotor shaft bearing 105 is seated. The case extending portion 103 may be formed adjacent to the first intermediate cover 104. Referring to FIG. 3, it can be seen that the space in which the stator 110 and the rotor 120 are disposed and the space in which the planetary gear unit 20 is disposed are distinguished by the case extending portion 103.

In summary, the case extending portion 103 is formed radially inward of the motor case 102, and the rotor shaft bearing 105 is seated in the inside of the case extending portion 103 in the radial direction. In addition, the rotor shaft 130, the power input shaft 310, and the differential shaft 330 are disposed in the inside of the rotor shaft bearing 105 in the radial direction in order.

In addition, various ball bearings, a fixing structure, an oil flow path, and the like may be further provided inside the housing 100. Such a configuration is an auxiliary configuration for operation of the driving apparatus 1, and a description thereof will be omitted. In addition, the configurations illustrated in FIG. 3 may be added or omitted by way of example.

Hereinafter, the planetary gear unit 20 will be described in detail with reference to FIG. 3.

Figure 4:
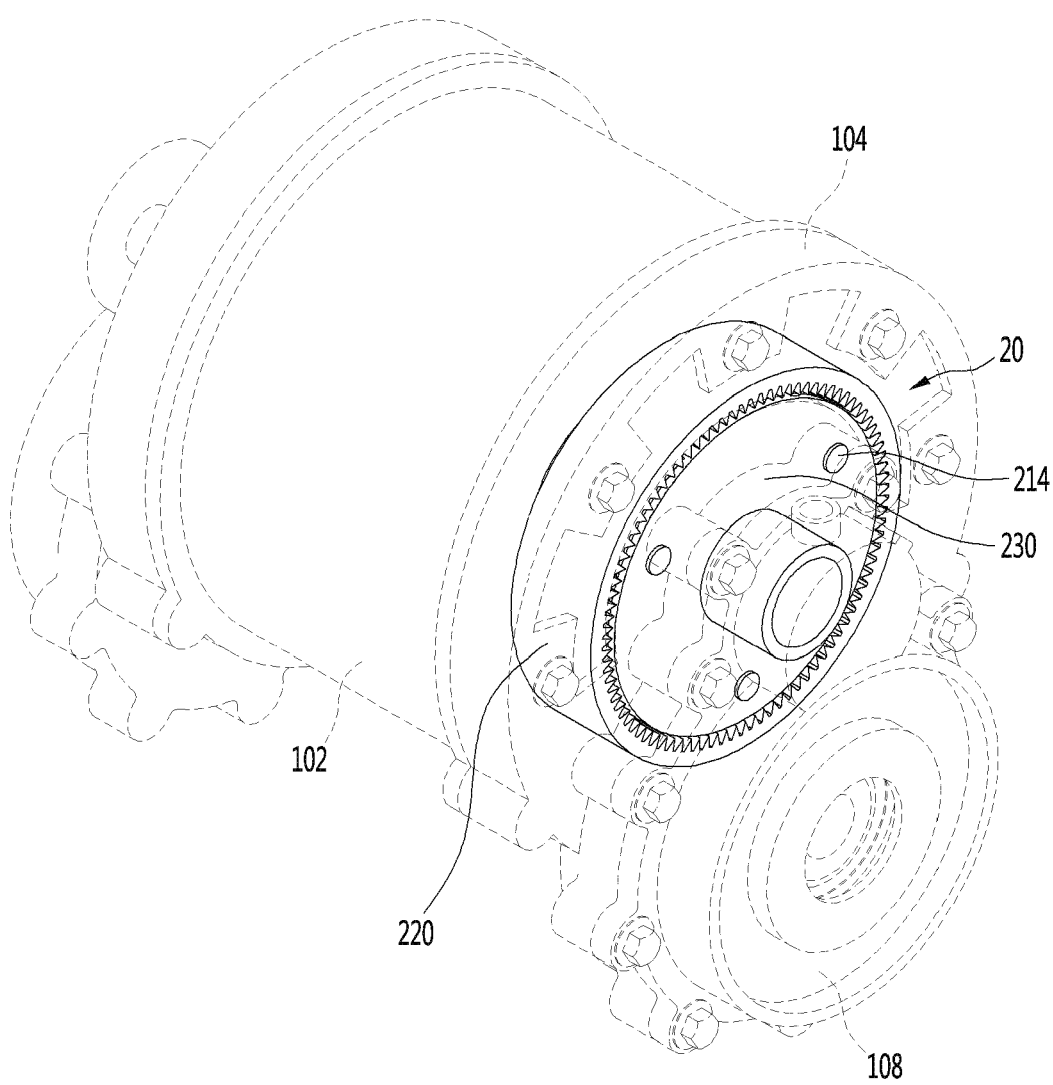
FIG. 4 is a view illustrating a state where a planetary gear unit of the driving apparatus for an electric vehicle according to the first embodiment of the present disclosure is installed.
Figure 5:
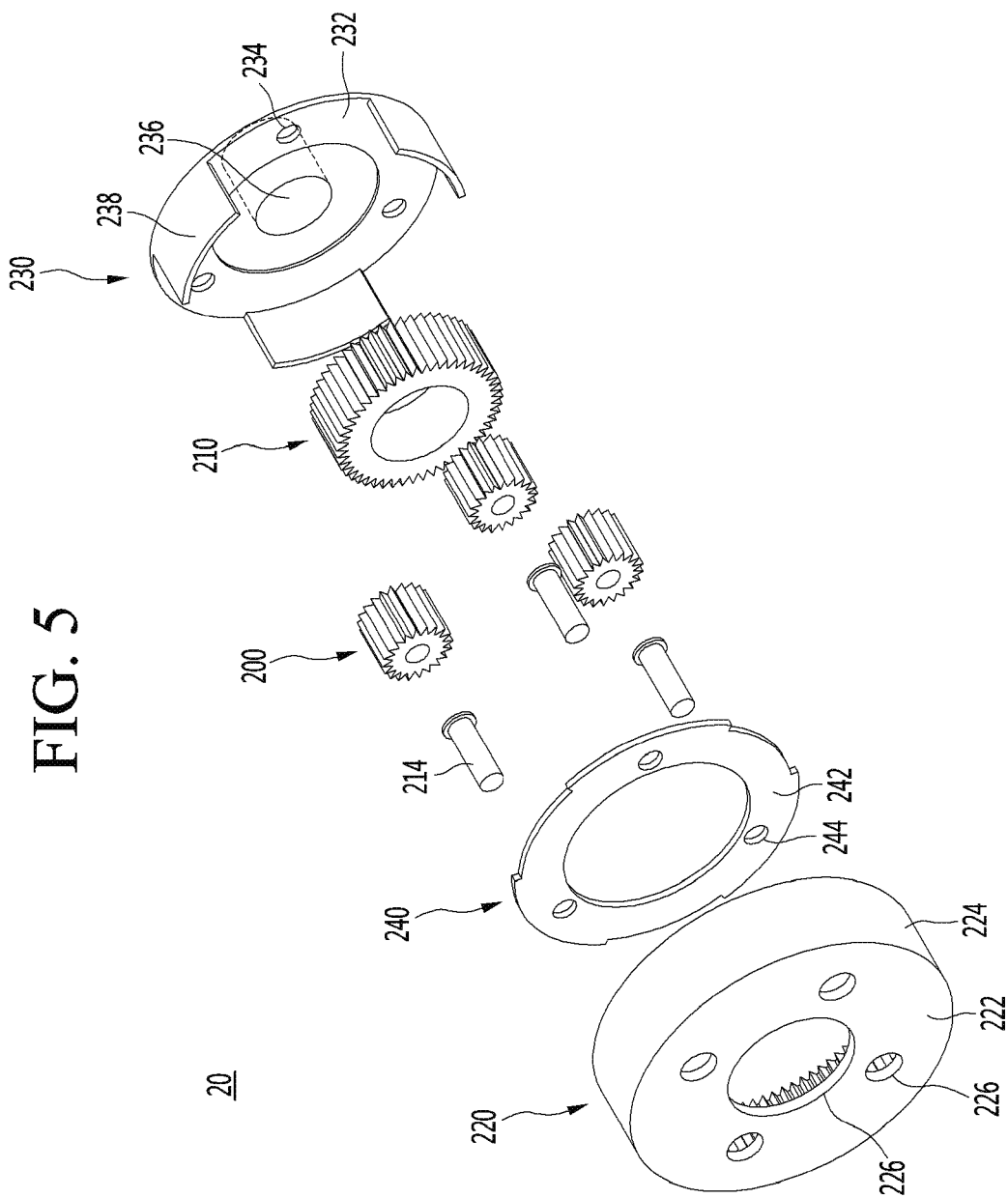
FIG. 5 is an exploded view of the planetary gear unit of the driving apparatus for an electric vehicle according to the first embodiment of the present disclosure.

FIG. 4 is a view illustrating a state where the planetary gear unit of the driving apparatus for an electric vehicle according to the first embodiment of the present disclosure is installed, FIG. 5 is an exploded view of the planetary gear unit of the driving apparatus for an electric vehicle according to the first embodiment of the present disclosure.

As illustrated in FIG. 4, the planetary gear unit 20 may be disposed inward of the first intermediate cover 104 in the radial direction. In other words, the planetary gear unit 20 may be positioned on one side of the motor case 102.

In addition, as illustrated in FIGS. 4 and 5, the planetary gear unit 20 is configured such that the planetary gear 200, the sun gear 210, the ring gear 220, and the carrier 230 are coupled to each other. First, the shape of each component will be described in detail.

As illustrated in FIG. 5, the sun gear 210 is provided in a ring shape having gear teeth on the outside thereof. The gear teeth of the sun gear 210 and the like are described as spur gears extending in a straight line, but these are merely illustrative. For example, the sun gear 210 may have gear teeth extending diagonally.

As described above, the sun gear 210 is coupled to the rotor shaft 139. Accordingly, the rotor shaft 139 may be inserted into the sun gear 210 and coupled therewith. In other words, an opening corresponding to the outer diameter of the rotor shaft 139 may be formed inside the sun gear 210.

In addition, referring to FIG. 3, the sun gear 210 is coupled to the axial end and the radial outside of the rotor shaft 130. Accordingly, the sun gear 210 can be rotated together with the rotation of the rotor shaft 130.

As illustrated in FIG. 5, a plurality of the planetary gears 200 are provided. In addition, each of the planetary gears 200 is provided in the form of a ring having outer gear teeth like the sun gear 210. The respective planetary gears 200 may be formed to have a smaller size than the sun gear 210.

As described above, the planetary gear 200 may be disposed on the outer peripheral surface of the sun gear 210 and interlocked with the sun gear 210. In other words, a plurality of planetary gears 200 are disposed on the outside of the sun gear 210 in the radial direction. Especially, the plurality of planetary gears 200 having the same size are provided and are disposed at equal intervals in the peripheral direction.

In other words, the plurality of planetary gears 200 are disposed at equal intervals in the peripheral direction on the outside of the sun gear 210 in the radial direction. For example, in FIG. 5, three planetary gears 200 which are disposed in a state of being spaced at intervals of 120 degrees in the peripheral direction along the outer peripheral surface of the sun gear 210 are illustrated.

Accordingly, the planetary gear 200 can be rotated according to the rotation of the sun gear 210. In detail, each of the planetary gears 200 rotates in engagement with the sun gear 210 and revolves along the outer peripheral surface of the sun gear 210.

In addition, the planetary gear unit 20 further includes a planetary gear shaft 214 coupled to the center of the planetary gear 200. The planetary gear shaft 214 is provided in the same number as the number of the planetary gears 200 and inserted into the center of each planetary gear 200. The planetary gear shaft 214 extends in the axial direction, and both ends thereof can be fixed.

In other words, the planetary gear 200 is rotatably fixed to the planetary gear shaft 214. Accordingly, the planetary gear 200 can be freely rotated, that is, rotated, with respect to the planetary gear shaft 214. In addition, as the planetary gear 200 revolves along the outer peripheral surface of the sun gear 210, the planetary gear shaft 214 is also rotated.

Accordingly, both ends of the planetary gear shaft 214 can be fixed and rotated. Both ends of the planetary gear shaft 214 are coupled to the carrier 230 and a retarder 240 to be described above, respectively.

As illustrated in FIG. 5, the carrier 230 is formed in a circular plate shape as a whole. In addition, as illustrated in FIG. 4, the carrier 230 forms an outer appearance of one side of the planetary gear unit 20 in the radial direction.

The carrier 230 includes a carrier main body 232, a carrier through-hole 234, a carrier connection portion 236, and a carrier coupling portion 238. For the sake of convenience of explanation, the configuration of the carrier 230 is divided, and each configuration can be integrally formed.

The carrier main body 232 is provided as a ring-shaped flat plate. The carrier main body 232 may be provided to cover one end of the sun gear 210 and the planetary gear 200 in the axial direction. In other words, the outer peripheral surface of the carrier main body 232 is provided so as to correspond to the outside of the planetary gear 200 coupled to the sun gear 210.

A plurality of the carrier through-holes 234 are formed in the carrier main body 232 such that the planetary gear shaft 214 is inserted. Specifically, the number of the carrier through-holes 234 is equal to the number of the planetary gears 200 and the planetary gear shafts 214. In addition, the carrier through-holes 234 are equally spaced in the peripheral direction so as to correspond to the disposition of the planetary gears 200.

Accordingly, three carrier through-holes 234 may be spaced at 120 degrees in the peripheral direction. As the planetary gear shaft 214 is inserted into the carrier through-hole 234, the carrier 230 can be rotated to be interlocked with rotation of the planetary gear 200. In detail, the planetary gear 200 is revolved along the outer peripheral surface of the sun gear 210, so that the planetary gear shaft 214 and the carrier 230 coupled thereto can be rotated together.

The carrier connection portion 236 extends from the inner peripheral surface of the carrier main body 232 in the axial direction. As illustrated in FIG. 4, the carrier connection portion 236 is located at the outermost position of the planetary gear unit 20 in the axial direction. Further, the carrier connection portion 236 may be formed to extend adjacent to the case cover 108.

In addition, the carrier connection portion 236 is formed in a hollow cylindrical shape. In addition, the power input shaft 310 is inserted into and coupled to the opened inside of the carrier connection portion 236. Accordingly, as the carrier 230 rotates, the power input shaft 310 can rotate.

The carrier coupling portion 238 extends from the outer peripheral surface of the carrier main body 232 in the axial direction. The carrier coupling portion 238 corresponds to a configuration for coupling with the retainer 240 to be described later.

The carrier connection portion 236 and the carrier coupling part 238 extend in directions opposite to each other. Referring to FIG. 3, the carrier connection portion 236 extends to the right side in the figure, and the carrier coupling portion 238 extends leftward in the drawing. In other words, the carrier connection portion 236 may be formed to extend adjacent to the motor case 102.

Further, a plurality of carrier coupling portions 238 in which are spaced apart from each other in the peripheral direction are formed. As illustrated in FIG. 5, the carrier coupling portion 238 extends in a predetermined arc shape. It can be understood that this is to prevent interference with the planetary gear 200.

In detail, at least a portion of the planetary gear 200 is disposed so as to protrude radially from the carrier 230 to the outside so as to engage with the ring gear 220. In other words, the carrier coupling portion 238 is not formed at a portion where the planetary gear 200 is disposed.

Therefore, the carrier through-holes 234 are formed between the plurality of carrier coupling portions 238 in the peripheral direction. Accordingly, the number of the carrier coupling portions 238 may be the same as the number of the carrier through-holes 234.

In addition, the planetary gear unit 20 further includes a retainer 240 to which the other end of the planetary gear shaft 214 is coupled. The retainer 240 can be understood as a configuration for fixing the planetary gear 200 so as to maintain a predetermined interval therebetween.

The retainer 240 includes a retainer main body 242 and a retainer through-hole 244 formed in the retainer main body 242. The retainer main body 242 is provided as a ring-shaped flat plate. The outer diameter of the retainer main body 242 may be the same as the outer diameter of the carrier main body 232.

In addition, the outer diameter of the retainer main body 242 may be formed with a step for coupling with the carrier coupling portion 238. Therefore, the carrier coupling portion 238 can be fitted to the outer peripheral surface of the retainer main body 242 and coupled thereto.

A plurality of the retainer through-hole 244 are formed in the retainer main body 242 so that the planetary gear shaft 214 is inserted thereinto. In detail, the retainer through-hole 244 is formed to be the same as the number of the planetary gears 200 and the planetary gear shafts 214. In addition, the retainer through-holes 244 are equally spaced in the peripheral direction so as to correspond to the disposition of the planetary gears 200.

In other words, one end of the planetary gear shaft 214 is coupled to the carrier through-hole 234, and the other end thereof is coupled to the retainer through-hole 244. Accordingly, both ends of the planetary gear shaft 214 can be fixed to the carrier main body 232 and the retainer main body 242. Then, the planetary gear 200 is rotated along the sun gear 210, so that the carrier 230 and the retainer 240 can be rotated together.

The planetary gear 200 is rotated between the ring gear 220 and the sun gear 210. The ring gear 220 is fixed without being rotated and can be understood as a configuration for assisting rotation of the ring gear 220.

In addition, as illustrated in FIG. 4, the ring gear 220 may form an outer appearance of the planetary gear unit 20 together with the carrier 230. In detail, the ring gear 220 forms an axial one side and a radial outside of the planetary gear unit 20, and the carrier 230 forms an outer appearance of the other axial side of the planetary gear unit 20 in the axial direction.

Accordingly, the sun gear 210, the planetary gear 200, the retainer 240, and the planetary gear shaft 214 are disposed inside the ring gear 220 and the carrier 230. One end of the planetary gear shaft 214 may be exposed to the outside of the carrier 230.

Hereinafter, the ring gear 220 will be described in detail.

Figure 6:
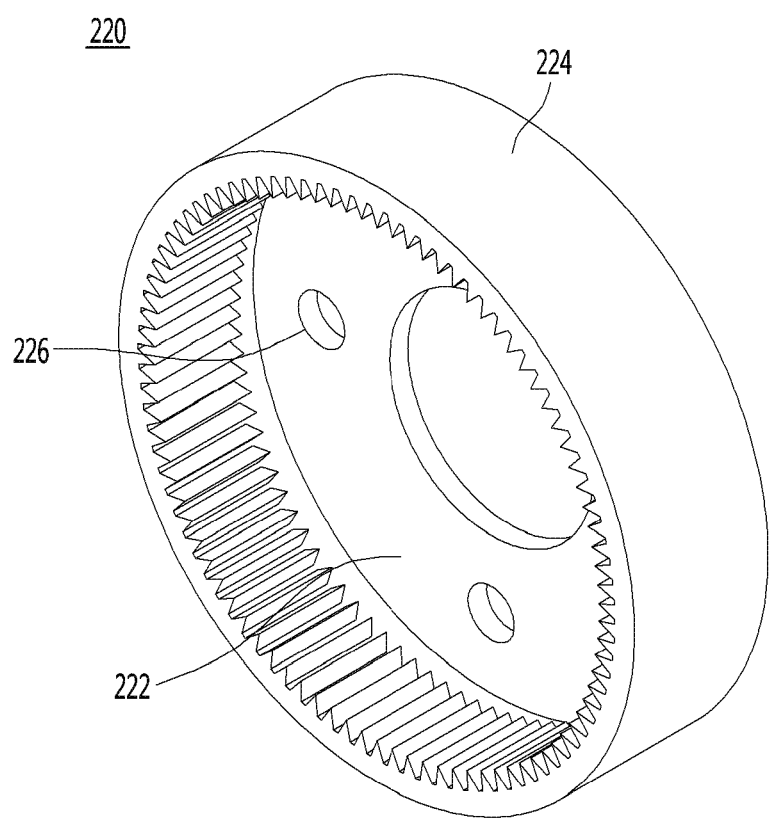
FIG. 6 is a view illustrating a ring gear of the driving apparatus for an electric vehicle according to the first embodiment of the present disclosure.

FIG. 6 is a view illustrating a ring gear of a driving apparatus for an electric vehicle according to the first embodiment of the present disclosure. FIG. 6 can be understood as a view illustrating the ring gear illustrated in FIG. 5 from another side surface.

As illustrated in FIG. 6, the ring gear 220 is configured with a ring gear main body 222 and a ring gear connection portion 224. For the sake of convenience of explanation, the configuration of the ring gear 220 is divided, and each configuration can be integrally formed.

The ring gear main body 222 is formed of a ring-shaped flat plate. The ring gear main body 222 forms an outer appearance of one side of the planetary gear unit 20 in the axial direction. The ring gear connection portion 224 extends from the outer peripheral surface of the ring gear main body 222 in the axial direction.

In other words, the ring gear 220 is provided as a shape which extends to the outside in the radial direction as a whole and extends in one side in the axial direction. Accordingly, the cross section of the ring gear 220 illustrated in FIG. 3 may be formed in an 'L' shape.

The outer diameter of the ring gear main body 222 is larger than the outer diameter of the carrier main body 232. Accordingly, the ring gear connection portion 224 extending from the outer peripheral surface of the ring gear main body 222 can form an outer surface of the planetary gear unit 20 in the radial direction. Referring to FIG. 4, it can be seen that the ring gear connection portion 224 is disposed outermost of the planetary gear unit 20 in the radial direction.

The ring gear connection portion 224 extends in the same direction as the carrier connection portion 236. In other words, the ring gear connection portion 224 extends in a direction opposite to the carrier coupling portion 238. Particularly, the ring gear connection portion 224 and the carrier coupling portion 238 may be disposed on the same line in the axial direction.

Referring to FIG. 3, it can be seen that the ring gear connection portion 224 is disposed outward of the carrier coupling portion 238 in the radial direction. The carrier coupling portion 238 and the ring gear coupling portion 224 are disposed to be slightly spaced from each other. Accordingly, when the carrier 230 is rotated, the carrier may not interfere with the ring gear 220.

In addition, gear teeth may be formed inside the ring gear connection portion 224 to engage with the planetary gear 200. In other words, the planetary gear 200 may be disposed between the ring gear connection portion 224 and the sun gear 210 and rotated.

As described above, the ring gear connection portion 224 is formed to extend in the axial direction on the outer peripheral surface of the ring gear main body 222. Conversely, the ring gear main body 222 is formed to extend inwardly from one end of the ring gear connection portion 224 in the radial direction.

In addition, the ring gear main body 222 is spaced apart from the rotor shaft 130 so as not to interfere with the rotor shaft 130. In other words, the inner diameter of the ring gear main body 222 is larger than the outer diameter of the rotor shaft 130.

In addition, the ring gear main body 222 corresponds to a configuration which is coupled to the housing 10. In particular, the ring gear main body 222 may be coupled to the case extending portion 103 described above. In particular, the ring gear main body 222 may be coupled to the case extending portion 103 to fix the rotor shaft bearing 105.

Hereinafter, the ring gear 220 and the rotor shaft bearing 105 will be described in detail.

Figure 7:
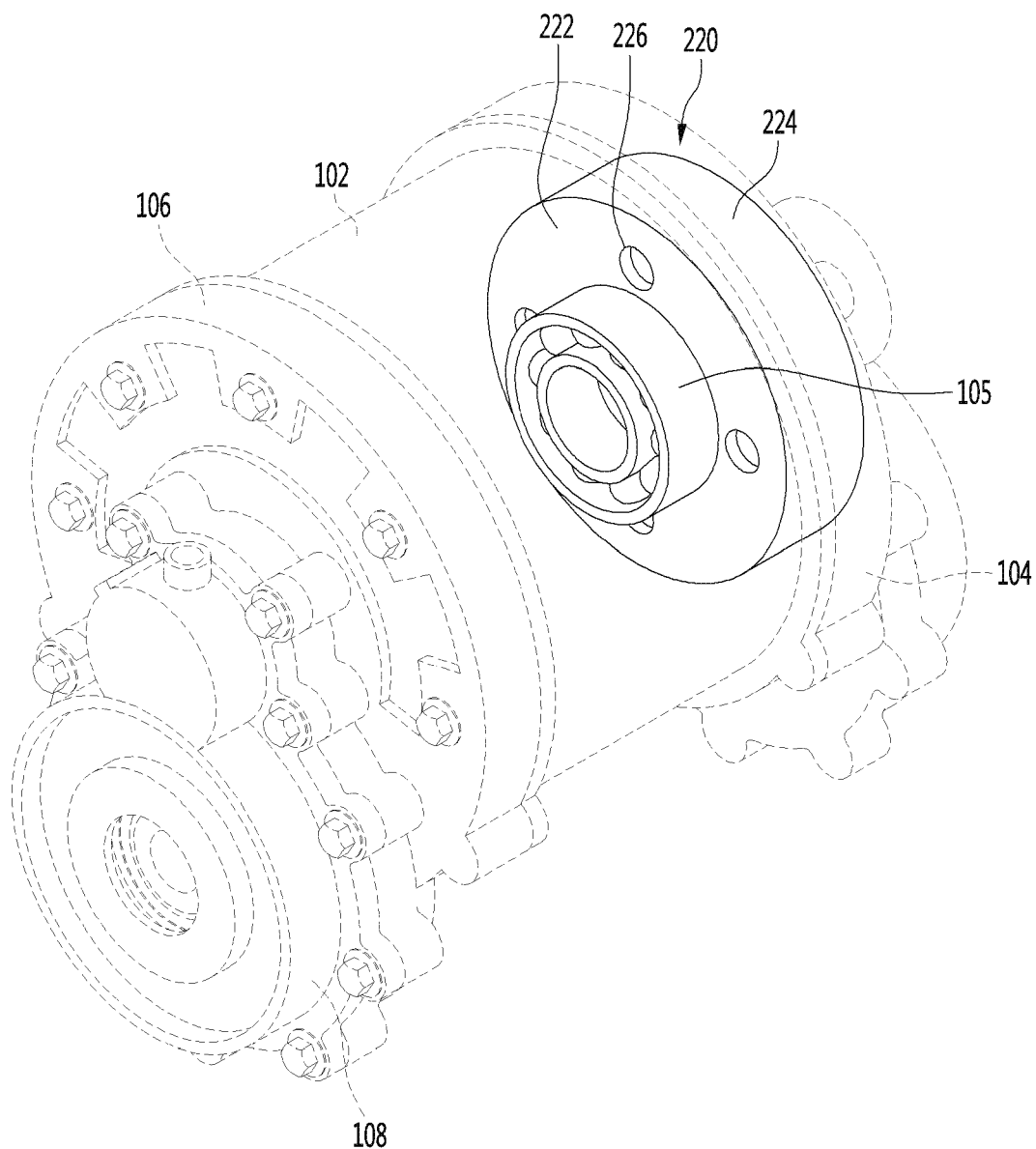
FIG. 7 is a view illustrating a state where a ring gear and a rotor shaft bearing are installed in the driving apparatus for an electric vehicle according to the first embodiment of the present disclosure.
Figure 8:
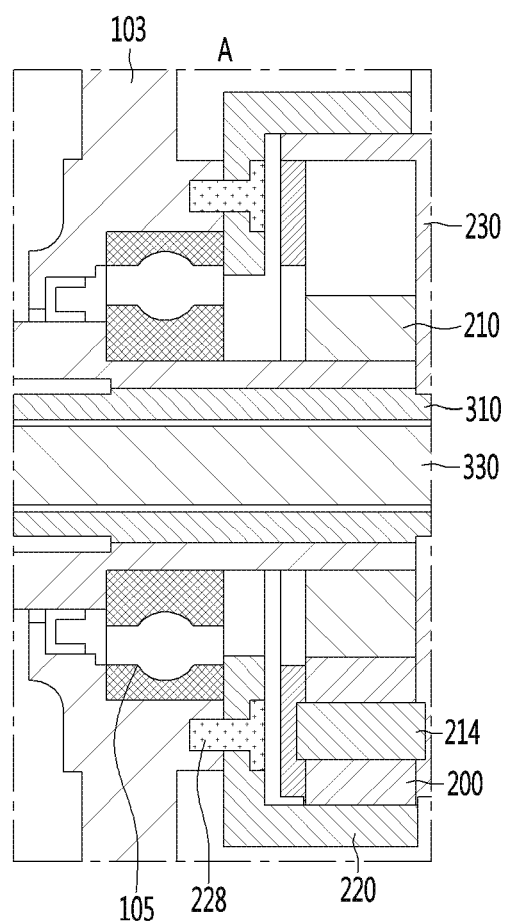
FIG. 8 is an enlarged view of portion 'A' in FIG. 3.

FIG. 7 is a view illustrating a state where a ring gear and a rotor shaft bearing of a driving apparatus for an electric vehicle according to the first embodiment of the present disclosure, and FIG. 8 is an enlarged view of a portion 'A' of FIG. 3 are installed.

As illustrated in FIGS. 7 and 8, the rotor shaft bearing 105 is disposed on one side of the ring gear 220. In detail, the ring gear main body 222 and the rotor shaft bearing 105 are disposed in contact with each other.

The rotor shaft bearing 105 may be a ball bearing. In particular, the rotor shaft bearing 105 may correspond to a radial ball bearing in which balls are disposed between the outer ring and the inner ring divided in the radial direction.

As described above, the rotor shaft bearing 105 corresponds to a configuration which supports the rotor shaft 130 in a rotatable manner. Specifically, the rotor shaft 130 is inserted in the inside of the rotor shaft bearing 105 in the radial direction. According to the rotation of the rotor shaft 130, the inner ring and the ball of the rotor shaft bearing 105 are rotated, and the outer ring thereof can be fixed and supported.

The outer ring, that is, the outside of the rotor shaft bearing 105 is fixed by the case extending portion 103 and the ring gear 220. In detail, the rotor shaft bearing 105 is seated on one side of the case extending portion 103 in the axial direction. In other words, the case extending portion 103 is formed to extend inward from the motor case 102 in the radial direction so that one surface of the rotor shaft bearing 105 in the axial direction is seated.

Particularly, the case extending portion 103 may be provided with an accommodation portion having a shape corresponding to the rotor shaft bearing 105. Accordingly, as the rotor shaft bearing 105 is seated in the case extending portion 103, the rotor shaft bearing can be fixed in the radial direction.

Also, one side of the rotor shaft bearing 105 in the axial direction is fixed by the case extending portion 103. In addition, the other side of the rotor shaft bearing 105 in the axial direction is fixed by the ring gear 220. In other words, the rotor shaft bearing 105 is fixedly disposed between the case extending portion 103 and the ring gear 220 in the axial direction.

The ring gear 220 may be coupled to the case extending portion 103 by a predetermined fastening member or the like. In other words, the rotor shaft bearing 105 is disposed between the ring gear 220 and the case extending portion 103 and can be fixed as the ring gear 220 is coupled to the case extending portion 103.

Particularly, the ring gear main body 222 is coupled to the case extending portion 103 via the ring gear fastening member 228. The ring gear main body 222 is formed with a ring gear penetrating opening 226 into which the ring gear fastening member 228 is inserted. The ring gear fastening member 228 and a plurality of the ring gear penetrating opening 226 may be provided.

In this manner, the ring gear 220 according to the present application functions to fix the rotor shaft bearing 105 in addition to the function that the planetary gear 200 is engaged and rotated. A separate configuration (Hereinafter referred to as a fixing member) for coupling the rotor shaft bearing 105 to the case extending portion 103 has existed in the related art.

As the ring gear 220 replaces the fixed member,

1) The unnecessary configuration which is referred to as the fixing member can be eliminated, and the material cost is reduced. In addition, the step of coupling the fixing member to the case extending portion 103 may be omitted.

In addition, 2) the planetary gear unit 20 is disposed to be spaced apart from the fixed member so as to avoid interference with the fixed member. In other words, the planetary gear unit 20 is disposed so as to protrude more axially. Accordingly, the separation distance can be deleted as the ring gear 220 is in contact with and coupled to the rotor shaft bearing 105. In other words, the driving apparatus 1 may be provided with a smaller volume in the axial direction.

Further, as the ring gear 220 is coupled to the case extending portion 103 so as to fix the rotor shaft bearing 105, vibration can be reduced. Hereinafter, this will be described in detail.

Figure 9:
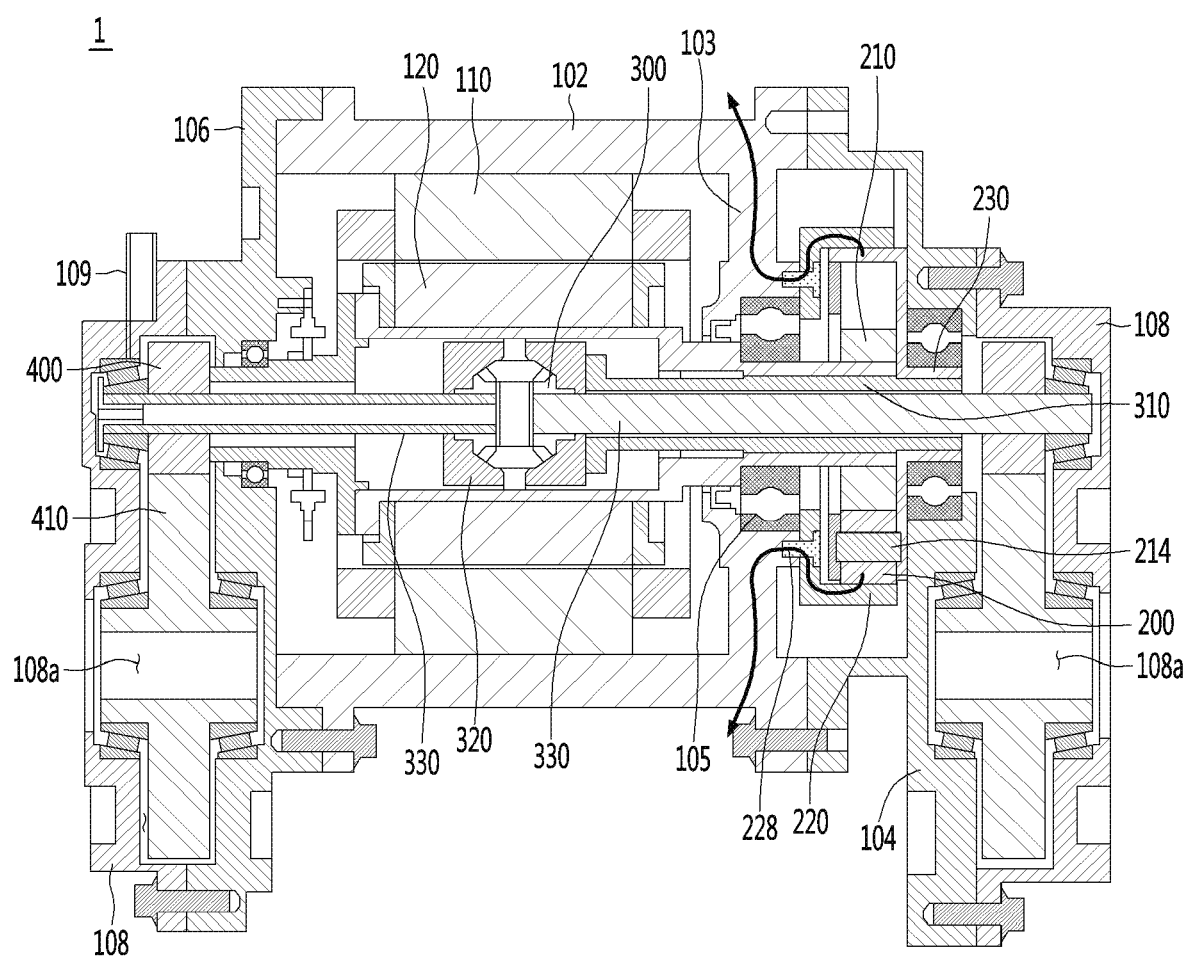
FIG. 9 is a view schematically illustrating transmission of vibration in the driving apparatus for an electric vehicle according to the first embodiment of the present disclosure.

FIG. 9 is a view schematically illustrating transmission of vibration in a driving apparatus for an electric vehicle according to the first embodiment of the present disclosure.

As illustrated in FIG. 9, the vibration can be transmitted along the fastened portion. Therefore, by driving the driving motor 10, the gearbox is operated and vibration is generated. In particular, vibration is transmitted to the outside of the driving apparatus 1 through the ring gear 220 connecting the gearbox and the housing 10 to each other.

Specifically, vibration is transmitted to the ring gear connection portion 224 engaged with the planetary gear 200. Vibration is transmitted from the ring gear connection portion 224 to the ring gear main body 222. Vibration is transmitted to the case extending portion 103 through the ring gear fastening member 228 coupled to the ring gear penetrating opening 226.

In other words, the vibration is transmitted from the planetary gear 200 to the ring gear 220 in the radial direction and is transmitted from the ring gear 220 to the case extending portion 103 in the axial direction. In other words, the direction of the vibration transmitted along the ring gear 220 is changed.

The ring gear penetrating opening 226 is formed inward of the carrier 230 in the radial direction, not outward thereof. Specifically, the ring gear penetrating opening 226 is formed inward of the outer peripheral surface of the carrier main body 232 or the carrier coupling portion 238 in the radial direction. In other words, the ring gear fastening member 228 is disposed inward of the outer peripheral surface of the carrier main body 232 or the carrier coupling portion 238 in the radial direction.

This means that the point of coupling between the ring gear 220 and the case extending portion 103 is located radially inward. Referring to FIG. 9, a point of coupling (hereinafter referred to as fixed point) between the ring gear 220 on which the ring gear fastening member 228 is disposed and the case extending portion 103 can be confirmed.

The fixing point is provided on the outer peripheral surface of the carrier main body 232 in the radial direction or on the inside of the carrier coupling portion 238. In addition, the fixed point is provided at a position corresponding to the rotor 120 in the axial direction. For example, the ring gear fastening member 228 may be disposed on the same line as the planetary gear shaft 214 in the axial direction.

The vibration transmitted to the case extending portion 103 is transmitted to the outside of the driving apparatus 1.

When it is explained referring to the arrows illustrated in FIG. 9, first, vibration is transmitted from the planetary gear 220 to the outside of the ring gear connection portion 224 in a radial direction. In other words, the vibration is transmitted from the portion rotatably disposed in the gearbox to the fixed portion.

Vibration is transmitted along the ring gear main body 222 from the ring gear connection portion 224. Since the ring gear 220 is formed to extend in the axial direction and in the radial direction, the direction of the vibration transmitted along the ring gear 220 can be changed.

In addition, vibration is transmitted from the ring gear 220 to the case extending portion 103 in the axial direction along the ring gear fastening member 228. As described above, a portion of the case extending portion 103 in which the ring gear fastening member 228 is installed is positioned at an inside in the radial direction.

Vibration is radially outwardly transmitted from the portion where the ring gear fastening member 228 is coupled to the motor case 102 along the case extending portion 103. In addition, vibration may be transmitted to the outside through the motor case 102.

As a result, it can be seen that the transmission path of the vibration is relatively long and the transmission direction is continuously changed as illustrated by an arrow in FIG. 9. The vibration has a characteristic that in a case where the transmission path is long and the transmission direction is changed, the size thereof is reduced. Therefore, only the vibration of a relatively small size among the vibrations generated according to the driving of the driving apparatus 1 can be transmitted to the outside of the driving apparatus 1.

In other words, as the ring gear 220 is coupled and formed to fix the rotor shaft bearing 105, the effect of increasing the path of the vibration transmitted to the outside and the change of the direction of the vibration can be obtained.

FIGS. 10 to 17 relate to a driving apparatus for an electric vehicle according to a second embodiment. Hereinafter, the same reference numerals are used for the same components as those described in the first embodiment.

Figure 10:
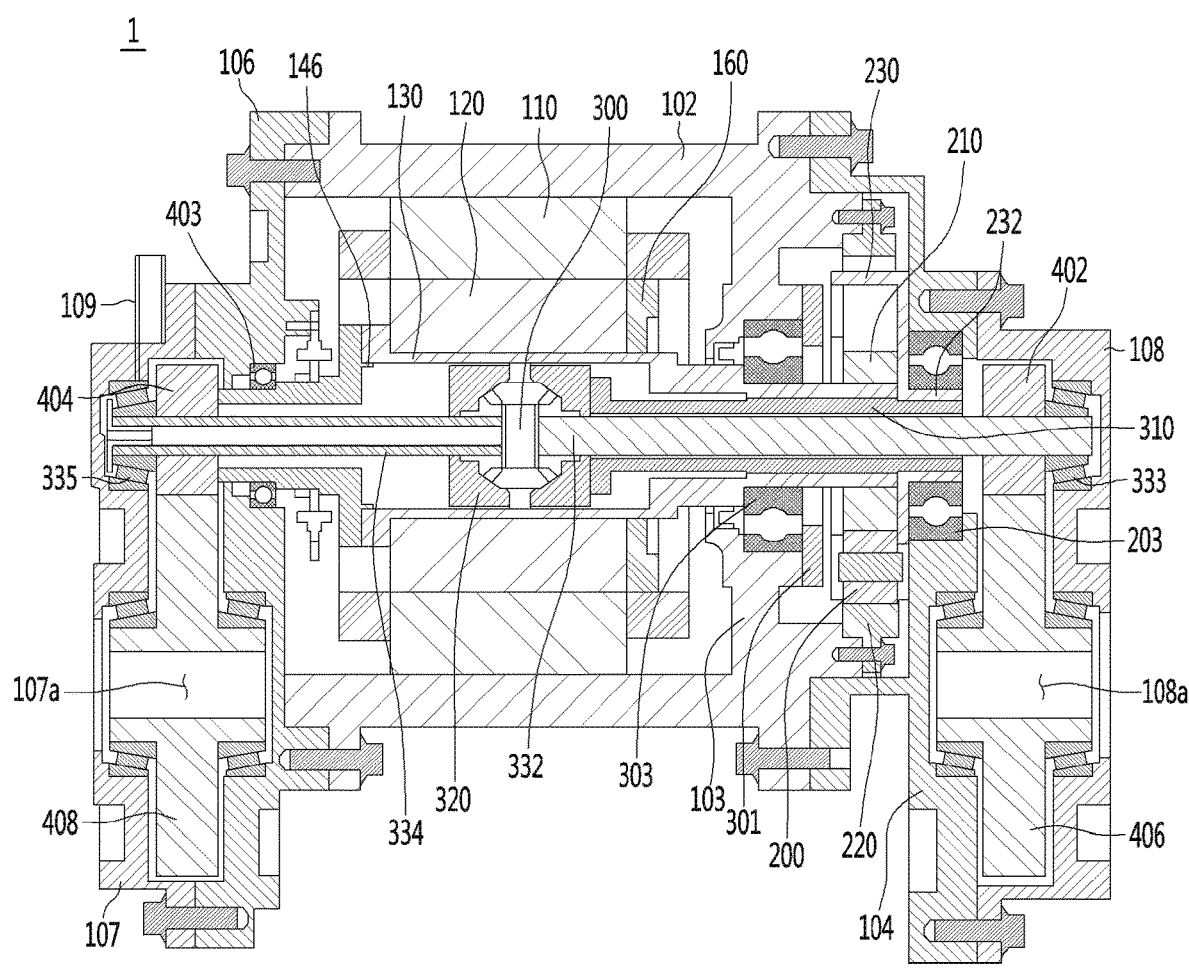
FIG. 10 is a sectional view taken along line III-III' of FIG. 2 according to a second embodiment of the present disclosure.

FIG. 10 is a sectional view taken along line III-III' of FIG. 2 according to a second embodiment of the present disclosure.

As illustrated in FIG. 10, the driving apparatus 1 includes a housing 100 forming an outer appearance. As described above, various configurations are disposed inside the housing 100. The configuration such as the stator 110 and the ring gear 220 may be fixed to the inside of the housing 100.

The housing 100 includes a plurality of covers 102, 104, 106, 107, and 108 coupled to each other. The plurality of covers 102, 104, 106, 107 and 108 are aligned in the axial direction and can be coupled to each other via a plurality of fastening members 101.

The plurality of covers include a motor case 102 which accommodates the driving motor 10, intermediate covers 104 and 106 coupled to both sides of the motor case 102, and a case cover 108 and 107 which are coupled to sides of the intermediate covers 104 and 106, respectively.

The motor case 102 may be provided in a hollow cylindrical shape extending in the axial direction. The driving motor 10 can be seated on the inner peripheral surface of the motor case 102. In detail, the inner peripheral surface of the motor case 102 and the outer peripheral surface of the stator 110 may be disposed in close contact with each other. In other words, the inner peripheral surface of the motor case 102 is formed to have a size corresponding to the outer peripheral surface of the stator 110.

In addition, the intermediate covers 104 and 106 may be coupled to both sides of the motor case 102 in the axial direction, respectively. The intermediate cover may be divided into a first intermediate cover 104 coupled to one side of the motor case 102 in the axial direction and a second intermediate cover 106 coupled to the other side of the motor case 102 in the axial direction.

The axial direction means the lateral direction of FIG. 10. In addition, one side in the axial direction means the right direction and the other side in the axial direction means the left direction. It can be therefore understood that the first intermediate cover 104 is located on the right side of the motor case 102 and the second intermediate cover 106 is located on the left side of the motor case 102.

This is an example and thus it is sufficient that the axial direction corresponds to one direction, and the axial one side and the axial other side are opposite to each other.

In addition, both sides of the motor case 102 in the axial direction are formed to be opened. Accordingly, various configurations can be installed together with the motor case 102 and the first and second intermediate covers 104 and 106. For example, the differential shaft 330 may extend through the first and second intermediate covers 104 and 106 in the motor case 102.

One side of the motor case 102 in the axial direction may be formed to be opened as an area narrower than the other side in the axial direction. In other words, the motor case 102 is formed so that a portion which is coupled with the second intermediate cover 106 is opened to have a larger area than a portion which is engaged with the first intermediate cover 104.

Referring to FIG. 10, the left end portion of the motor case 102 is formed to extend in the axial direction. In other words, it can be understood that an area corresponding to the inner diameter of the motor case 102 or the outer diameter of the stator 110 is opened. The second intermediate cover 106 is coupled to cover the opened left end portion of the motor case 102.

Therefore, the second intermediate cover 106 is provided in a shape extending in the radial direction. In addition, the second intermediate cover 106 may be provided in the motor case 102 to extend further in the radial direction for installing the reduction gear unit 40. For example, in FIG. 3, the second intermediate cover 106 is formed to further extend downward from the motor case 102.

The right end portion of the motor case 102 is formed to extend radially inward. A portion of the motor case 102 extending radially inwardly so as to form the right end portion is referred to as a case extending portion 103. A rotor shaft bearing 303, which will be described later, may be seated on the case extending portion 103.

The first intermediate cover 104 is coupled to the right end portion of the motor case 102 so as to form a predetermined installation space. Accordingly, the first intermediate cover 104 extends in one axial direction and is provided in a radially extended shape.

Accordingly, the first intermediate cover 104 can be understood to have a shape extending further in the axial direction than the second intermediate cover 106. In addition, the first intermediate cover 104 may have a radial shape corresponding to the shape and size of the second intermediate cover 106.

In summary, it can be understood that the first intermediate cover 104 forms an installation space separate from the installation space formed by the motor case 102. Further, it can be understood that the second intermediate cover 106 does not form a separate installation space.

In addition, it can be understood as a configuration in which the first intermediate cover 104 is disposed on the side where the planetary gear unit 20 is disposed and the second intermediate cover 106 is disposed on the side where the planetary gear unit 20 is not disposed Configuration. In other words, the planetary gear unit 20 may be disposed in a predetermined installation space formed by the first intermediate cover 104 and the right end portion of the motor case 102.

The case covers 107 and 108 include a first case cover 109 coupled to the first intermediate cover 104 and a second case cover 107 coupled to the second intermediate cover 106. Specifically, the first case cover 108 is coupled to one side of the first intermediate cover 104 in the axial direction, and the second case cover 107 is coupled to the other side of the second intermediate cover 106 in the axial direction.

Accordingly, it can be seen that the second case cover 107, the second intermediate cover 106, the motor case 102, the first intermediate cover 104, and the first case cover 108 are aligned in a side in the axial direction in order. In addition, each cover may be coupled to an adjacent cover through a plurality of fastening members 101 to form a single housing 100.

The first and second case covers 108 and 107 may have the same shape and size. The first and second case covers 108 and 107 are respectively formed with case cover through-holes 107a and 108a to which axles are coupled. The axle may extend into the driving apparatus 1 through the case cover through-holes 107a and 108a and may be coupled with the reduction gear 40.

In addition, at least one of the first and second case covers 108 and 107 may be provided with an oil injection port 109 for injecting oil into the driving apparatus 1. For example, in FIG. 2 and FIG. 3, the oil injection port 109 is formed in the second case cover 107.

As illustrated in FIG. 10, the driving motor 10, the planetary gear unit 20, the differential gear unit 30, and the reduction gear unit 40 are disposed in the housing 100.

Figure 11:
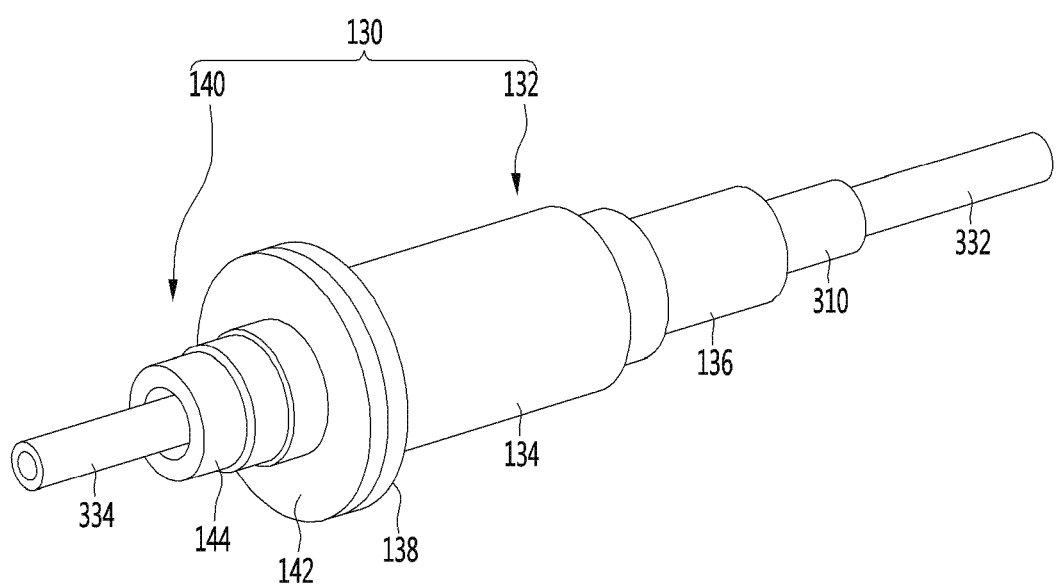
FIG. 11 is a view illustrating a portion of the configuration of a driving apparatus for an electric vehicle according to a second embodiment of the present disclosure.
Figure 12:
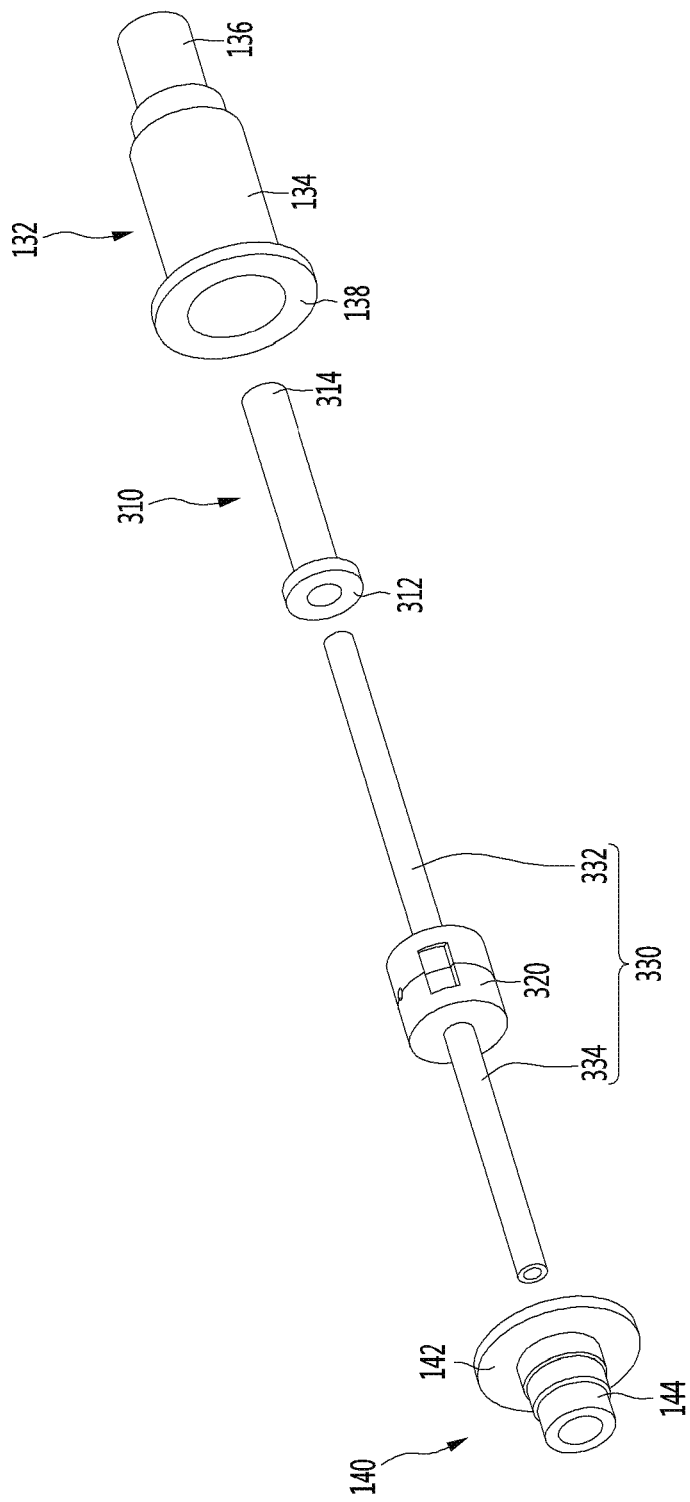
FIG. 12 is an exploded view illustrating the configuration illustrated in FIG. 11.

FIG. 11 is a view illustrating a portion of the configuration of a driving apparatus for an electric vehicle according to a second embodiment of the present disclosure, and FIG. 12 is an exploded view illustrating the configuration illustrated in FIG. 11.

The driving motor 10 includes the stator 110, the rotor 120, and the rotor shaft 130. As described above, the stator 110 is fixed to the inside of the motor case 102. Specifically, the stator 100 is disposed radially inward of the motor case 102 so that the outer peripheral surface of the stator 100 is in close contact with the inner peripheral surface of the motor case 102.

The rotor 120 is disposed inward of the stator 110 in the radial direction. The stator 110 and the rotor 120 may be provided in a hollow cylindrical shape having both axial sides opened. In addition, although the rotor 120 and the stator 110 are illustrated as being in contact with each other in FIG. 10, a predetermined interval may be formed between the rotor 120 and the stator 110 to prevent rotational interference.

The rotor shaft 130 is coupled to the rotor 120 so that the rotor 120 and the rotor shaft 130 can rotate together. The rotor shaft 130 can be understood as a structure for transmitting the rotational force of the rotor 120 to the gearbox. Accordingly, the rotor shaft 130 is formed to extend in the axial direction in the rotor 120.

In particular, the rotor shaft 130 extends on both sides of the rotor 120 in the axial direction. In addition, at least a portion of the rotor shaft 130 is disposed inward of the rotor 120 in the radial direction. In summary, the rotor shaft 130 extends from the inside of the rotor 120 toward the first and second intermediate covers 104, 106 in the axial direction.

In addition, at least a portion of the rotor shaft 130 extending to a side of the first intermediate cover 104 can be interlocked with the planetary gear unit 20. Accordingly, the power of the driving motor 10 can be transmitted to the planetary gear unit 20 through the rotor shaft 130.

In addition, at least a portion of the rotor shaft 130 is disposed inward of the rotor 120 in the radial direction. Therefore, the rotor shaft 130 is divided into a portion disposed on the inside of the rotor 120 (hereinafter referred to as a rotor shaft main body) and a portion disposed on the outside of the rotor 120 (hereinafter referred to as a rotor shaft extending portion).

The rotor shaft extending portion can be understood as a portion extending in the axial direction in the rotor 120. Since the rotor shaft 130 extends to both sides of the rotor 120 in the axial direction, the rotor shaft extending portion is divided into a first rotor shaft extending portion extending from the rotor 120 to a side in the axial direction, and a second rotor shaft extending portion extending from the rotor 120 to the other side in the axial direction.

Hereinafter, the shape of the rotor shaft 130 will be described in detail with reference to the rotor shaft 130 illustrated in FIGS. 10 to 12.

The rotor shaft 130 may be formed by combining a plurality of configurations. As illustrated in FIGS. 3 to 5, the rotor shaft 130 may be formed by combining two configurations. Hereinafter, the rotor shaft is divided into the first rotor shaft 132 and the second rotor shaft 140 which is coupled to the other side of the first rotor shaft 132 in the axial direction.

The first rotor shaft 132 may be divided into a rotor shaft main body 134, a rotor shaft seating portion 138, and a rotor shaft connection portion 136. The rotor shaft main body 134, the rotor shaft seating portion 138, and the rotor shaft connection portion 136 are divided for the sake of convenience of explanation and may be integrally formed with each other.

The rotor shaft main body 134 corresponds to a portion inserted into the rotor 120. The rotor shaft main body 134 is provided in a cylindrical shape with both sides in the axial direction passing through and being hollow inside. The outer peripheral surface of the rotor shaft main body 134 may be in contact with the inner peripheral surface of the rotor 120.

Referring to FIG. 10, the rotor shaft main body 134 is accommodated in an inside of the rotor 120 in the radial direction. The rotor shaft main body 134 covers the entire inner peripheral surface of the rotor 120. In other words, the outer peripheral surface of the rotor shaft main body 134 has a shape and a size corresponding to the inner peripheral surface of the rotor 120.

However, this is an example, and the rotor shaft main body 134 may be provided so as to cover a portion of the inner peripheral surface of the rotor 120. For example, a plurality of the rotor shaft main body 134 which are spaced apart from each other in the axial direction may be provided. Accordingly, the internal space of the rotor 120 may be wider or the size of the rotor 120 may be reduced.

The rotor shaft connection portion 136 corresponds to a portion extending to one side from the rotor shaft main body 134 in the axial direction. In other words, the rotor shaft connection portion 136 is a portion disposed on the outside of the rotor 120 and corresponds to a portion extending to one side from the rotor 120 in the axial direction. In other words, the rotor shaft connection portion 136 may be referred to as the first rotor shaft extending portion described above.

The rotor shaft connection portion 136 is provided in a cylindrical shape in which both sides thereof in the axial direction is penetrated to be opened and which has a hollow inside thereof. In addition, the outer diameter of the rotor shaft connection portion 136 may be smaller than the outer diameter of the rotor shaft main body 134. This is because it is necessary to form a larger inner space because the differential gear case 320 having a relatively large volume is disposed inside the rotor shaft main body 134.

Further, the rotor shaft connection portion 136 may be understood as a portion coupled with the planetary gear unit 20. The rotor shaft connection portion 136 extends in the axial direction from the rotor shaft main body 134 toward the planetary gear unit 20. The sun gear 210 is connected to the extended end portion of the rotor shaft connection portion 136 and can be rotated to be interlocked with the rotor shaft connection portion 136. In particular, the sun gear 210 is coupled outwardly of the rotor shaft connection 136 in the radial direction.

In addition, a rotor shaft bearing 303 for rotatably supporting the rotor shaft 130 is disposed outside the rotor shaft connection portion 136 in the radial direction. The rotor shaft bearing 303 can be understood as a configuration for preventing the rotor shaft 130 from deviating from the rotation center axis.

As described above, the rotor shaft bearing 303 corresponds to a configuration which is seated in the case extending portion 103. Referring to FIG. 10, it can be seen that the rotor shaft bearing 303 is seated on one side of the case extending portion 103 in the axial direction. In other words, it can be understood that the rotor shaft bearing 303 is disposed on one side of the motor case 101 in the axial direction.

Accordingly, it can be understood that the rotor shaft bearing 303 is disposed between the motor case 102 and the first intermediate cover 104. In addition, a bearing fixing member 301 is disposed on a side of the rotor shaft bearing 303 in the axial direction. The bearing fixing member 301 corresponds to a configuration which is coupled to the case extending portion 103 to fix the rotor shaft bearing 303 in the axial direction.

In addition, the outer peripheral surface of the rotor shaft connection portion 136 may be formed to be stepped so as to be coupled with different configurations from each other such as the rotor shaft bearing 303 and the sun gear 210. In particular, the outer peripheral surface of the rotor shaft connection portion 136 may be stepped so that the length in the radial direction becomes smaller as the outer peripheral surface of the rotor shaft connection portion 136 moves away from the rotor shaft main body 134.

The rotor shaft seating portion 138 corresponds to a portion of the rotor shaft main body 134 extending to the other side in the axial direction. In other words, the rotor shaft seating portion 138 is a portion which is disposed on the outside of the rotor 120 and corresponds to a portion extending toward the other side from the rotor 120 in the axial direction. In other words, the rotor shaft seating portion 138 may be included in the second rotor shaft extending portion described above.

The rotor shaft seating portion 138 is formed so as to extend outward from the rotor shaft main body 134 in the radial direction. In detail, the rotor shaft seating portion 138 may be provided in the form of a ring-shaped disk. Accordingly, the outer diameter of the rotor shaft seating portion 138 may be larger than the outer diameter of the rotor shaft main body 134.

Accordingly, the first rotor shaft 132 may be configured such that the rotor shaft seating portion 138, the rotor shaft main body 134, and the rotor shaft extending portion 136 are sequentially arranged in one side in the axial direction. Further, the first rotor shaft 132 can be understood to have a shape in which the outer diameter thereof decreases to be stepped toward one side in the axial direction.

In addition, the rotor shaft seating portion 138 can be understood as a portion for fixing the rotor 120 in the axial direction. The rotor 120 is provided in a structure in which a plurality of cores are stacked and requires a configuration for fixing the plurality of cores to prevent the plurality of cores from being separated during rotation. In detail, it is necessary to fix both sides of the rotor 120 in the axial direction.

The rotor shaft seating portion 138 is disposed to fix the other side of the rotor 120 in the axial direction. As illustrated in FIG. 10, the outer diameter of the rotor shaft seating portion 138 may be smaller than the outer diameter of the rotor 120. Accordingly, the rotor shaft seating portion 138 can support at least a portion of the rotor 120.

In addition, referring to FIG. 10, an end ring 160 is disposed on one side of the rotor 120 in the axial direction. In other words, the rotor 120 can be fixed in the axial direction by the rotor shaft seating portion 138 and the end ring 160.

The end ring 160 is disposed adjacent to the planetary gear unit 20 rather than the rotor shaft seating portion 138. In other words, the end ring 160 is disposed adjacent to the first intermediate cover 104, and the rotor axial seating portion 138 is disposed adjacent to the second intermediate cover 106.

In addition, the end ring 160 is provided in a form of a ring-shaped disk, and the outer peripheral surface and the inner peripheral surface thereof may be formed to be the same as the outer peripheral surface and the inner peripheral surface of the rotor 120. In other words, the outer diameter of the rotor shaft seating portion 138 is provided to be smaller than the outer diameter of the rotor 120 and the end ring 160.

In addition, the rotor shaft seating portion 138 may be understood as a portion coupled with the second rotor shaft 140. The rotor shaft seating portion 138 and the second rotor shaft 140 may be coupled by a predetermined fastening structure or fastening member.

As described above, the second rotor shaft 140 is disposed on the other side of the first rotor shaft 132 in the axial direction. In other words, the second rotor shaft 140 is a portion disposed on the outside of the rotor 120 and corresponds to a portion extending in the axial direction on the other side of the rotor 120. In other words, the second rotor shaft 140 and the rotor shaft seating portion 138 may correspond to the second rotor shaft extending portion.

The second rotor shaft 140 may be divided into a rotor shaft seating portion 142 and a cover coupling portion 144. The rotor shaft seating portion 142 and the cover connection portion 144 are divided into each other for convenience of explanation and thus may be integrally formed with each.

It can be understood as a configuration in which the rotor shaft seating portion 142 is seated on the rotor shaft receiving portion 138. So as to distinguish the rotor shaft seating portion from the rotor shaft seating portion described above, the rotor shaft seating portion 138 is referred to as a first rotor shaft seating portion and the rotor shaft seating portion 142 is referred to as a second rotor shaft seating portion.

The second rotor shaft seating portion 142 may be provided in a shape of a circular disk extending in the radial direction. The outer peripheral surface of the second rotor shaft seating portion 142 may be formed to be the same as the outer peripheral surface of the first rotor shaft seating portion 138. In other words, the second rotor shaft seating portion 142 and the first rotor shaft seating portion 138 may have the same outer diameter.

In addition, the inner peripheral surface of the second rotor shaft seating portion 142 may be smaller than the inner peripheral surface of the first rotor shaft seating portion 138. In other words, the inner diameter of the second rotor shaft seating portion 142 may be smaller than the inner diameter of the first rotor shaft seating portion 138.

The second rotor shaft seating portion 142 and the first rotor shaft seating portion 138 may be coupled to each other through a predetermined fastening member. In addition, coupling protrusions or the like may be formed on the first rotor shaft seating portion 138 or the second rotor shaft seating portion 142 so that the first rotor shaft seating portion 138 or the second rotor shaft seating portion 142 can be coupled in a form of the press-fitting.

For example, referring to FIG. 10, the second rotor shaft seating portion 142 is formed with a seating protrusion 146 inserted into the first rotor shaft seating portion 138. The seating protrusion 146 is formed to protrude toward the first rotor shaft seating portion 138 and is inserted into the inner peripheral surface of the first rotor shaft seating portion 138. Accordingly, the first rotor shaft seating portion 138 and the second rotor shaft seating portion 142 can be coupled.

The cover connection portion 144 extends from the second rotor shaft seating portion 142 toward the second intermediate cover 106 to the other side in the axial direction. In addition, the cover connection portion 144 may be provided in a cylindrical shape having both sides thereof axially opened and hollow inside. In addition, the outer appearance of the cover connection portion 144 may be smaller than the outer diameter of the second rotor shaft seating portion 142.

A rotor shaft bearing 403 for rotatably supporting the rotor shaft 130 is disposed outward of the cover connection portion 144 in the radial direction. The rotor shaft bearing 303 is referred to as a first rotor shaft bearing and the rotor shaft bearing 403 is referred to as a second rotor shaft bearing for distinguishing the rotor shaft bearing 403 from the rotor shaft bearing 303 described above.

The second rotor shaft bearing 403 corresponds to a configuration which is seated on the second intermediate cover 106. The second rotor shaft bearing 403 may be smaller than the first rotor shaft bearing 303. In other words, the second rotor shaft bearing 403 may be provided to support an external force smaller than that of the first rotor shaft bearing 303.

This is because the portion supported by the first rotor shaft bearing 303 corresponds to a portion where the power is actually transmitted. In other words, the portion supported by the second rotor shaft bearing 403 does not transmit power and corresponds to a simply supported portion.

Accordingly, the rotor shaft 130 can be rotatably supported by the first rotor shaft bearing 303 and the second rotor shaft bearing 403. Specifically, the first rotor shaft bearing 303 and the second rotor shaft bearing 403 are disposed on both sides of the rotor 120 in the axial direction. As a result, the rotor shaft 130 can be stably rotated by supporting both axial sides thereof.

In addition, the outer peripheral surface of the cover connection portion 144 may be stepped to be coupled with the second rotor shaft bearing 403 or the like. In particular, the outer peripheral surface of the cover connection portion 144 may be stepped so that the outer diameter of the outer peripheral surface of the cover connection portion 144 decreases as the distance from the second rotor shaft seating portion 142 increases.

The planetary gear unit 20 corresponds to a configuration in which power is transmitted from the driving motor 10. The planetary gear unit 20 includes the sun gear 210, the planetary gear 200, the ring gear 220, and the carrier 230, as illustrated in FIG. 10.

In addition, the planetary gear unit 20 is disposed between the first intermediate cover 104 and the motor case 102. In other words, the planetary gear unit 20 is disposed in an installation space formed by the first intermediate cover 104. Referring to FIG. 10, the planetary gear unit 20 is disposed in a state of being separated from the driving motor 10 by the case extending portion 103.

The ring gear 220 may be fixed by being coupled to one side of the motor case 102 in the axial direction. In detail, the ring gear 220 is coupled to the case extending portion 103. In addition, the ring gear 220 may be coupled outwardly of the first rotor shaft bearing 303 in the radial direction.

The planetary gear 200, the sun gear 210 and the carrier 230 are positioned inward of the ring gear 220 in the radial direction. In other words, it can be understood as a configuration in which the ring gear 220 is located at the outermost position of the planetary gear unit 20 in the radial direction.

As described above, the sun gear 210 is disposed outside the rotor shaft 130. Therefore, the sun gear 210 can be understood as receiving the power of the rotor shaft 130. Accordingly, the sun gear 210 can be rotated together by the rotation of the rotor shaft 130.

In particular, the sun gear 210 is coupled outward of the first rotor shaft extending portion 136 (rotor shaft connection portion) in the radial direction. Referring to FIG. 10, the sun gear 210 is coupled to one end portion of the first rotor shaft extension 136 in the axial direction. In other words, the first rotor shaft extending portion 136 is formed to extend to one side in the axial direction up to the sun gear 210.

The planetary gear 200 is disposed between the sun gear 210 and the ring gear 220. In detail, the gear teeth are formed on the outside of the sun gear 210 in the radial direction, and the gear teeth are formed on the inside of the ring gear 220 in the radial direction. Accordingly, the planetary gear 200 can be rotated in engagement with the sun gear 210 and the ring gear 220.

FIG. 10 illustrates one end surface of the driving apparatus 1, only one planetary gear 200 is illustrated, but a plurality of the planetary gears 200 may be provided. For example, the planetary gears 200 may be provided with three gears arranged at regular intervals.

The carrier 230 corresponds a configuration which is coupled with the planetary gear 200 and rotates together with the planetary gear 200. In other words, it can be understood that power is transmitted to the sun gear 210, the planetary gear 200, and the carrier 230. It is understood that the ring gear 220 does not correspond to a configuration in which power is transmitted, but corresponds a configuration which rotatably supports the planetary gear 200.

Referring to FIG. 10, the carrier 230 is formed to extend to one side of the sun gear 210, the planetary gear 200, and the ring gear 220 in the axial direction. One portion of the carrier 230 extending in the axial direction from the sun gear 210, the planetary gear 200 and the ring gear 220 is referred to as a carrier extending portion 232.

In other words, the carrier extending portion 232 can be understood as a configuration that is disposed on the outermost side of the planetary gear unit 20 in the axial direction. Further, the carrier extending portion 232 is located on one side of the first rotor shaft extending portion 136 in the axial direction. Referring to FIG. 10, it can be seen that the first rotor shaft extending portion 136 and the carrier extending portion 232 are disposed in the axial direction side by side.

The first rotor shaft extending portion 136 and the carrier extending portion 232 are illustrated in contact with each other. However, since the first rotor shaft extending portion 136 and the carrier extending portion 232 are configurations to which powers being different from each other are transmitted, the first rotor shaft extending portion 136 and the carrier extending portion 232 are disposed so as to be spaced apart from each other so that power is not transmitted therebetween.

A carrier bearing 203 for rotatably supporting the carrier 230 is disposed outward of the carrier extending portion 232 in the radial direction. The carrier bearing 203 can be understood as a configuration for preventing the carrier 230 from deviating from the rotational center axis.

The carrier bearing 203 corresponds to a configuration which is seated on the first intermediate cover 104. In particular, the carrier bearing 203 is disposed adjacent to the first case cover 108. Referring to FIG. 10, it can be understood that the planetary gear unit 20 is disposed between the first rotor shaft bearing 303 and the carrier bearing 203.

In addition, the carrier 230 may be coupled with the differential gear unit 30 and interlocked with the differential gear unit 30. In detail, the carrier 230 is coupled to a fixed end of a power input shaft 310 to be described later, rotatably supports the power input shaft 310, and transmits power.

The differential gear unit 30 corresponds to a configuration in which power is transmitted from the planetary gear unit 20. The differential gear unit 30 includes the power input shaft 310, the differential gear case 320, the differential gear 300, and the differential shaft 330, as illustrated in FIG. 10.

As illustrated in FIG. 12, the differential gear case 320 is formed into a cylindrical shape extending in the axial direction. Accordingly, the cross-section of the differential gear case 320 illustrated in FIG. 10 can be illustrated as a square.

In addition, referring to FIG. 10, the differential gear 300 is disposed inside the differential gear case 320. In particular, the differential gears 300 are disposed in a state of being interlocked with the differential gears 300 so as to be transmitted from the differential gear case 320.

The interlocked state refers to a state of contacting or being engaged with each other to receive power from each other. In other words, the interlocked states do not mean that they are mutually fixed or mutually supported. Therefore, when one is fixed, the other may not correspond to the fixed state.

The differential shaft 330 corresponds to a shaft extending in a state of being coupled with the differential gear 300. Particularly, the differential shaft 330 corresponds to a shaft which is coupled to the differential gear 300 and extends outwardly from the inside of the differential gear case 320. The differential shaft 330 extends through the differential gear case 320 and is rotated differently from the differential gear case 320.

Specifically, on both sides of the differential gear case 320 in the axial direction, an opening through which the differential shaft 330 passes is formed. The opening may be larger than the outer peripheral surface of the differential shaft 330 to prevent interference between the differential gear case 320 and the differential shaft 330.

In addition, a pair of the differential shafts 330 is provided and can be divided into a first differential shaft 332 and a second differential shaft 334. The first differential shaft 332 is coupled to one side of the differential gear 300 and extends to one side in the axial direction. Further, the second differential shaft 334 is coupled to the other side in the axial direction and extends to the other side in the axial direction. In other words, the first differential shaft 332 and the second differential shaft 334 extend in directions opposite to each other with respect to the differential gear 300.

In addition, the first differential shaft 332 extends from the differential gear 300 to the first case cover 108. In other words, as illustrated in FIG. 10, the first differential shaft 332 extends from the motor case 101 to the first case cover 108 through the first intermediate cover 104.

In addition, the second differential shaft 334 extends from the differential gear 300 to the second case cover 107. The second differential shaft 334 extends from the motor case 101 to the second case cover 107 through the second intermediate cover 106, as illustrated in FIG. 10.

The first case cover 108 is provided with a first differential shaft bearing 333 for rotatably supporting the first differential shaft 332. The second casing cover 107 is provided with a second differential shaft bearing 335 for rotatably supporting the second differential shaft 334.

Accordingly, both sides of the differential gear 300 in the axial direction is supported by the first differential shaft 332 and the second differential shaft 334. In other words, it can be understood that the differential gear 300 is symmetrically supported in the axial direction and relatively stably supported.

Any one of the pair of differential shafts 330 may be formed as a hollow shaft, and the other thereof may be formed as a solid shaft. As illustrated in FIG. 10, the first differential shaft 332 may be formed as a solid shaft, and the second differential shaft 334 may be formed as a hollow shaft.

Accordingly, the first differential shaft 332 can be more stably installed than the second differential shaft 334. This is because it is necessary to have a more stable structure on one side of the differential gear case 320 in the axial direction where the first primary shaft 332 is located. In detail, this is because the differential gear case 300 has an asymmetric structure in which one side in the axial direction is supported. This will be described in detail later.

The power input shaft 310 corresponds to a shaft which is coupled to and extends from the differential gear case 320. Particularly, the power input shaft 310 corresponds to a configuration which transmits the power of the planetary gear unit 20 to the differential gear case 320. In other words, the power input shaft 310 is configured to connect the planetary gear unit 20 and the differential gear case 320.

Both ends of the power input shaft 310 are referred to as a first end 312 and a second end 314, respectively. The first end 312 is coupled to the differential gear case 320 and the second end 314 is coupled to the planetary gear unit 20. Accordingly, it can be understood that the second end 314 is located on one side of the first end 312 in the axial direction.

The first end 312 may be coupled to the outside of the differential gear case 320. More specifically, the first end 312 is coupled to one end portion of the differential gear case 320 in the axial direction.

In addition, the second end 314 may be coupled to the carrier 230. Specifically, the second end 314 is coupled to the inside of the carrier extending portion 232 in the radial direction. Accordingly, the second end 314 may have an outer diameter corresponding to the inner diameter of the carrier extending portion 232.

The first end 312 is provided to have a larger cross-sectional area than the second end 314. Specifically, the first end 312 extends outward from the second end 314 in the radial direction, and the outer diameter of the first end 312 is larger than the outer diameter of the second end 314.

Further, the power input shaft 330 is provided as a hollow shaft, and the inner space thereof is the same area in the axial direction. The inner diameter of the first end 312 and the inner diameter of the second end 314 may be the same.

The reduction gear unit 40 corresponds to a structure that receives power from the differential gear unit 30.

Further, the reduction gear unit 40 corresponds to a configuration which transmits power to the axle.

As illustrated in FIG. 10, the reduction gear unit 40 includes reduction gears 402 and 404 coupled with the differential shafts 332 and 334. Specifically, the reduction gear unit 40 includes a first reduction gear 402 coupled to the first differential shaft 332 and a second reduction gear 404 coupled to the second differential shaft 334.

The first reduction gear 402 and the second reduction gear 404 are coupled to the outer peripheral surfaces of the first differential shaft 332 and the second differential shaft 334, respectively. The first reduction gear 402 and the second reduction gear 404 may be formed in the same shape as each other.

The first reduction gear 402 may be disposed inside the first case cover 108. In addition, the second reduction gear 404 may be disposed inside the second case cover 107 and the second intermediate cover 106. This disposition is because the side on which the first reduction gear 402 is disposed has a more complicated structure. This will be described in detail later.

The reduction gear unit 40 includes connection reduction gears 406 and 408 interlocked with the first reduction gear 402 and the second reduction gear 404. The connection reduction gears 406 and 408 are configured to transmit the power of the reduction gears 402 and 404 to the axle.

The connection reduction gear includes a first connection reduction gear 406 interlocked with the first reduction gear 402 and a second connection reduction gear 408 interlocked with the second reduction gear 404. The first connection reduction gear 406 and the second connection reduction gear 408 may be formed in the same shape as each other.

The number of gear teeth of the connection reduction gears 406 and 408 may be greater than the number of gear teeth of the reduction gears 402 and 404. Accordingly, the power can be decelerated in the process of being transmitted from the reduction gears 402 and 404 to the connection reduction gears 406 and 408.

The connection reduction gears 406 and 408 are disposed outward of the reduction gears 402 and 404 in the radial direction. Referring to FIG. 10, the connection reduction gears 406 and 408 may be disposed below the reduction gears 402 and 404. In addition, the connection reduction gears 406 and 408 are formed with openings communicating with the case cover through-holes 107a and 108a.

In addition, various ball bearings, a fixing structure, an oil flow path, and the like may be further provided inside the housing 100. Such a structure is generally used and thus the explanation thereof is omitted.

Hereinafter, the coupling relationship and disposition of the differential gear unit 30, the differential shaft 130, and the planetary gear unit 40 will be described in detail.

Figure 13:
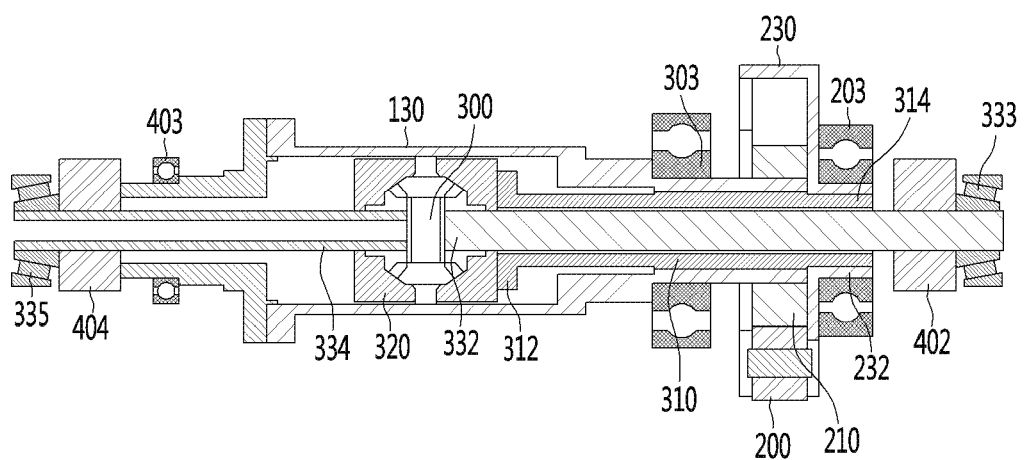
FIG. 13 is a partial sectional view illustrating the driving apparatus for an electric vehicle according to the second embodiment of the present disclosure.

FIG. 13 is a partial sectional view illustrating a driving apparatus for an electric vehicle according to a second embodiment of the present disclosure. FIG. 13 is a view illustrating the rotor shaft 130, the differential gear unit 30, the planetary gear unit 20, and various bearings in the cross section of the driving apparatus illustrated in FIG. 10.

As illustrated in FIG. 13, the rotor shaft 130 is supported by the first rotor shaft bearing 303 and the second rotor shaft bearing 403. In other words, the rotor shaft 130 is supported on both sides in the axial direction. Also, as described above, both sides of the planetary gear 300 in the axial direction is supported by the first differential shaft 332 and the second differential shaft 334.

The differential gear case 330 is disposed inside the driving motor 10. As described above, the differential gear case 330 and the driving motor 10 are not directly connected to each other on the power transmitting surface. In other words, the differential gear case 330 is spaced apart from the inside of the driving motor 10.

As illustrated in FIG. 10, the differential gear case 330 is spaced inward of the rotor shaft 130 in the radial direction. Further, referring to FIG. 10, the rotor shaft 130, the rotor 120, the stator 110, and the motor case 101 are arranged in order on the outside of the differential gear case 330 in the radial direction.

The power input shaft 310 supports the differential gear case 330 such that the rotor shaft 130 or the rotor 120 and the differential gear case 330 are spaced apart from each other. As described above, the differential gear 300 corresponds to a configuration which is interlocked with the differential gear case 330.

In other words, the differential gear case 330 is supported only by the power input shaft 310. The power input shaft 310 is disposed on one side of the differential gear case 330 in the axial direction. Accordingly, the differential gear case 330 is disposed in an asymmetric support structure supported only on one axial side.

Accordingly, the power input shaft 310 corresponds to a cantilever in terms of vibration. In detail, the first end 312 coupled to the differential gear case 330 corresponds to a free end, and the second end 314 coupled to the planetary gear unit 20 corresponds to a fixed end.

Hereinafter, the first end 312 is referred to as a free end and the second end 314 is referred to as a fixed end for convenience of explanation. In summary, the power input shaft 310 is provided as a form of a cantilever including a free end 312 coupled to the differential gear case 320 and a fixed end 314 fixedly coupled to the planetary gear unit 20.

In addition, the power input shaft 310 extends axially from the free end 312 to the fixed end 314. In addition, the free end 312 is coupled to one axial side of the differential gear case 320 in the axial direction and the fixed end 314 is coupled with an inside of the carrier 230 in the radial direction.

In particular, the fixed end 314 is in close contact with the carrier extending portion 232 and is fixed by the carrier bearing 203. In other words, it can be understood that the power input shaft 310 is rotatably supported by the carrier bearing 203.

In addition, the power input shaft 310 extends along the inside of the rotor shaft 130. In detail, the power input shaft 310 extends axially from the differential gear case 320 to a side in the radial direction along the inside of the rotor shaft 130 in the radial direction.

Any one of the pair of differential shafts 332 and 334 extends along the inside of the power transmission shaft 310. This is because the pair of differential shafts 332 and 334 extend to both sides of the differential gear case 320 in the axial direction while the power transmission shaft 310 extends to one side of the differential gear case 320 in the axial direction.

In addition, the pair of differential shafts 332 and 334 extend through the differential gear case 320 and are rotated differently from the differential gear case 320. Meanwhile, the power transmitting shaft 310 is coupled to the outside of the differential gear case 320 and rotated together with the differential gear case 320.

In particular, the first differential shaft 332 extending from one side of the differential gear 300 to one side in the axial direction extends along the inside of the power transmission shaft 310. The first differential shaft 332 and the second differential shaft 334 all extend in the axial direction along the inside of the rotor shaft 130 in the radial direction.

Accordingly, the power input shaft 310 and the rotor shaft 130 are disposed outward of the first primary shaft 332 in the radial direction. On the other hand, the rotor shaft 130 is disposed outside the second differential shaft 334 in the radial direction. In other words, it can be understood that the power input shaft 310 is disposed between the rotor shaft 130 and the first differential shaft 332, and an empty space is provided between the rotor shaft 130 and the second differential shaft 334.

The empty space means that there is no configuration between the rotor shaft 130 and the second differential shaft 334. In addition, there is actually a gap between the respective axes to prevent interference with each other. Therefore, in the present disclosure, the empty space and the gap should be distinguished from each other.

The power input shaft 310 further extends to one side of the rotor shaft 130 in the axial direction and is coupled to the carrier extending portion 232. In other words, the carrier extending portion 232 is disposed on one side of the rotor shaft 130 in the axial direction.

In addition, the first differential shaft 332 further extends to one side of the rotor shaft 130 in the axial direction and the power input shaft 310 and is coupled to the first reduction gear 402. In other words, the first reduction gear 402 is disposed on one side of the rotor shaft 130 and the power input shaft 310 in the axial direction.

Further, it can be understood that the first reduction gear 402 is disposed on one side of the carrier extending portion 232 in the axial direction. Accordingly, the carrier extending portion 232 is disposed between the first reduction gear 402 and the rotor shaft 130. In other words, the carrier bearing 203 is disposed between the first reduction gear 402 and the rotor shaft 130.

Further, the second differential shaft 334 further extends to the other side of the rotor shaft 130 and is coupled to the second reduction gear 404 in the axial direction. In other words, the second reduction gear 404 is disposed on the other side of the rotor shaft 130 in the axial direction.

The distance between the first reduction gear 402 and the rotor shaft 130 in the axial direction is larger than the distance between the second reduction gear 404 and the rotor shaft 130 in the axial direction. In other words, it corresponds to an empty space in which there is no configuration between the second reduction gear 404 and the rotor shaft 130. However, a gap may exist between the second reduction gear 404 and the rotor shaft 130.

In addition, as described above, the rotor shaft 130 includes a first rotor shaft extending portion 136 extending to one side of the rotor 120 in the axial direction and a second rotor shaft extending portion 138, 142, and 144 extending of the rotor 120 in the axial direction.

The power input shaft 310 and the first differential shaft 332 are disposed inward of the first rotor shaft extending portion 136 in the radial direction. In addition, the second differential shaft 334 is disposed inward of the second rotor shaft extensions 138, 142, and 144 in the radial direction.

The inner diameter of the first rotor shaft extending portion 136 is formed to be larger than the inner diameter of the second rotor shaft extending portions 138, 142, and 144. This is naturally more arranged on the inside of the first rotor shaft extension 136.

Figure 14:
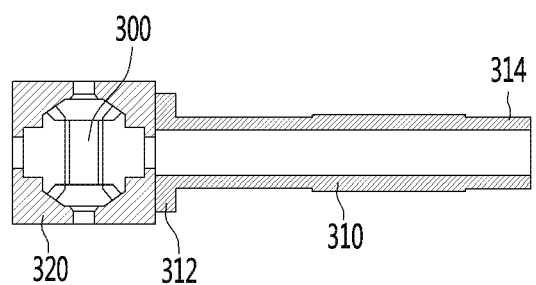
FIG. 14 is a sectional view illustrating a differential gear unit of the driving apparatus for an electric vehicle according to the second embodiment of the present disclosure.

FIG. 14 is a sectional view illustrating a differential gear unit of the driving apparatus for an electric vehicle according to the second embodiment of the present disclosure. In the differential gear unit 30 illustrated in FIG. 14, the differential shafts 332 and 334 are omitted for clarifying the supporting structure.

As illustrated in FIG. 14, the differential gear case 320 is supported by the power input shaft 310. More precisely, the differential gear case 320 is supported only by the power input shaft 310. Accordingly, the differential gear case 320 may correspond to a kind of load.

As described above, the power input shaft 310 includes the free end 312 and the fixed end 314. The free end 312 and the fixed end 314 correspond to both ends of the power input shaft 310 and are opposed in the axial direction.

The free end 312 is coupled with the differential gear case 320. In other words, the free end 312 is not fixed at a predetermined position. In addition, a load corresponding to the differential gear case 320 is applied to the free end 312.

In addition, the fixed end 314 is coupled with the carrier 230 and the carrier bearing 203. In other words, the fixed end 314 corresponds to a fixed state at a predetermined position. In summary, the power input shaft 310 corresponds to a beam fixed at only one end (fixed end) 314.

As the driving motor 10 is operated, the rotor 120 and the rotor shaft 130 are rotated. In addition, power is transmitted to the planetary gear unit 20 through the rotor shaft 130. Power is transmitted from the planetary gear unit 20 to the differential gear case 320 through the power input shaft 310.

The power input shaft 310 and the differential gear case 320 may be coupled to each other and rotated together. In this operation, the power input shaft 310 and the differential gear case 320 can be vibrated. In other words, the power input shaft 310 and the differential gear case 320 can be moved in the radial direction.

As described above, the power input shaft 310 and the differential gear case 320 are positioned inward of the rotor shaft 130 in the radial direction. Therefore, in a case where the power input shaft 310 and the differential gear case 320 are moved in the radial direction, interference with the rotor shaft 130 may occur.

In other words, a problem may occur due to vibration of the power input shaft 310 and the differential gear case 320. For example, when the differential gear case 320 is in contact with the rotor shaft 130, breakage thereof may occur. In addition, the efficiency of the driving apparatus 10 can be reduced because the power input shaft 310 cannot transmit the required power.

Hereinafter, a driving apparatus according to another embodiment for reducing such vibration will be described.

Figure 15:
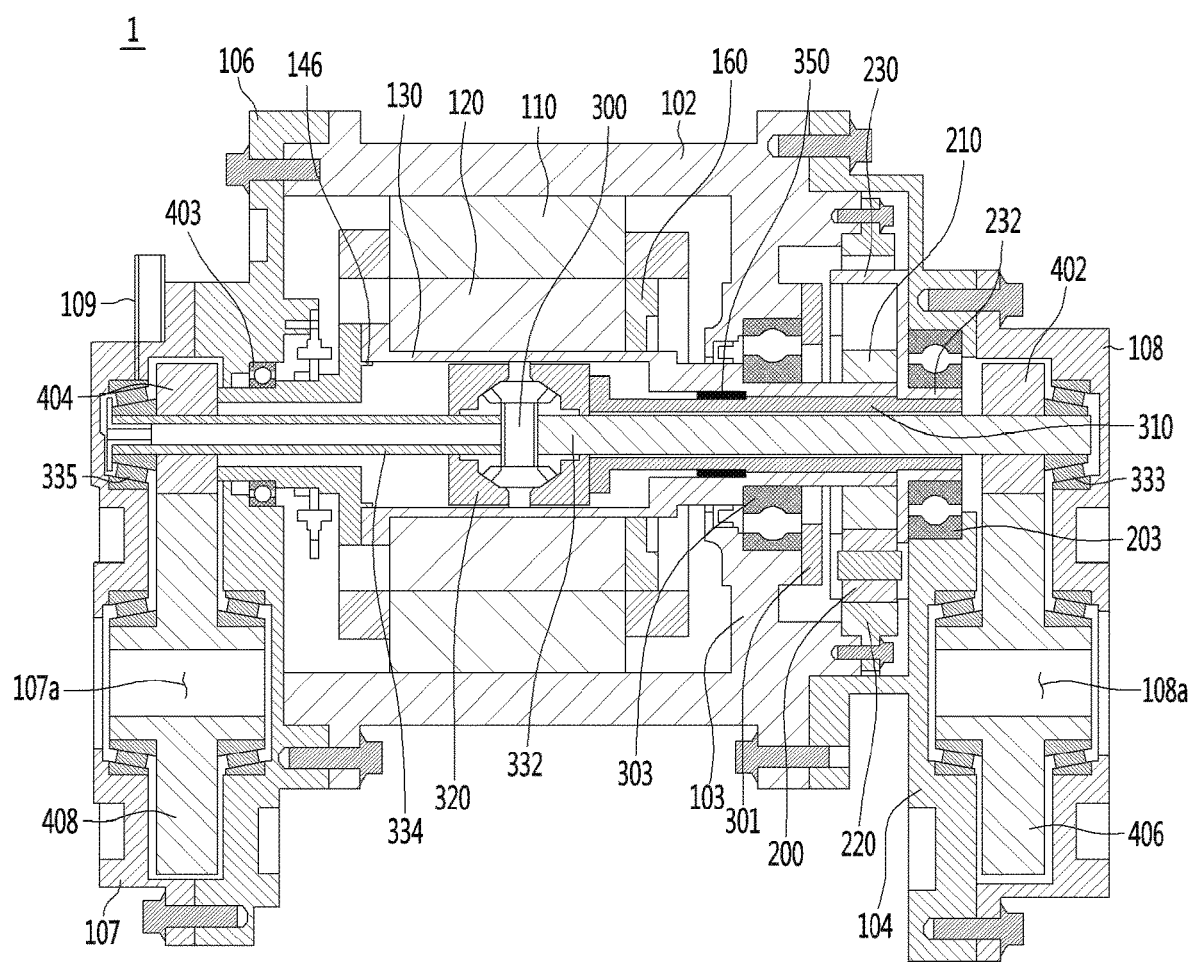
FIG. 15 is a sectional view illustrating the driving apparatus for an electric vehicle according to the second embodiment of the present disclosure.
Figure 16:
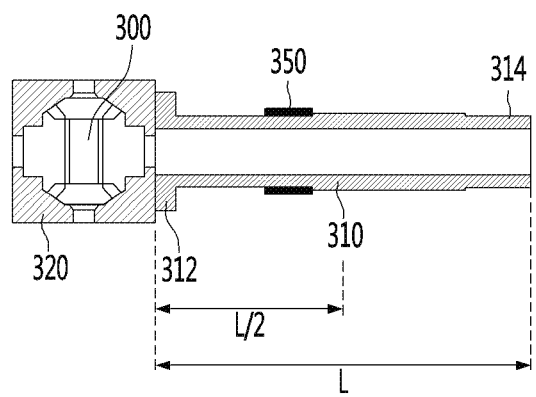
FIG. 16 is a sectional view illustrating the differential gear unit of the driving apparatus for an electric vehicle according to the second embodiment of the present disclosure.

FIG. 15 is a sectional view illustrating a driving apparatus for an electric vehicle according to the second embodiment of the present disclosure, and FIG. 16 is a sectional view illustrating a differential gear unit of a driving apparatus for an electric vehicle according to the second embodiment of the present disclosure. In addition, FIG. 17 is a view illustrating various examples of the vibration reduction bearing illustrated in FIGS. 15 and 16.

As illustrated in FIGS. 15 and 16, the driving apparatus 1 according to the idea of the present disclosure further includes a vibration reduction bearing 350. a configuration illustrated in FIGS. 15 and 16 except for the vibration reduction bearing 350 correspond to the configurations described above, and the same reference numerals are used and the description thereof is cited.

The vibration reduction bearing 350 is disposed between the power input shaft 310 and the rotor shaft 130. Specifically, the vibration reduction bearing 350 is provided in a ring shape fitted to the outer peripheral surface of the power input shaft 310. In addition, the vibration reduction bearing 350 is provided as a ring shape which is seated on the inner peripheral surface of the rotor shaft 130.

Figure 17:
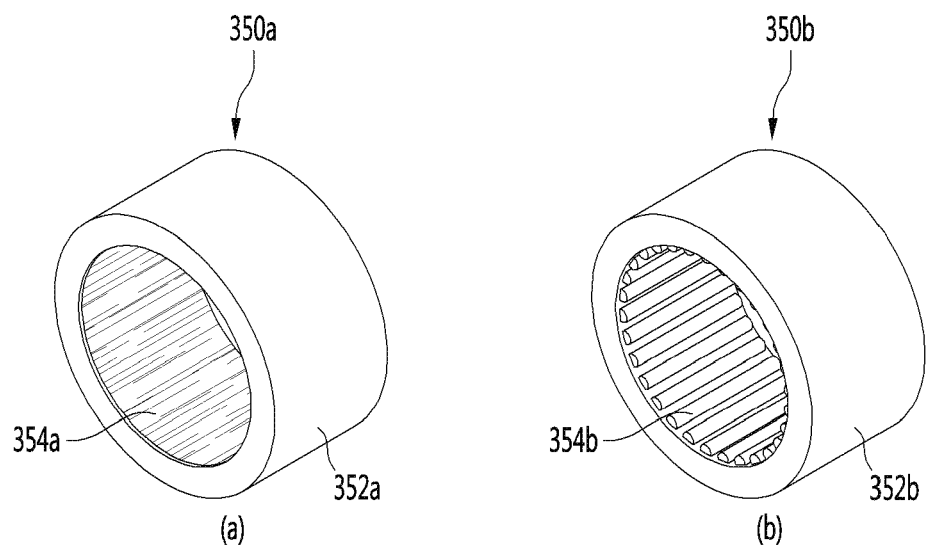
FIG. 17 is a view illustrating various examples of the vibration reduction bearing illustrated in FIGS. 15 and 16.

FIG. 17 illustrates a specific example of the vibration reduction bearing 350. For the convenience of explanation, the vibration reduction bearing 350 illustrated in FIG. 17(a) is referred to as a first implementation bearing 350a. The vibration reduction bearing 350 illustrated in FIG. 17(b) is referred to as a second implementation bearing 350b.

Referring to FIG. 17(a), the first implementation bearing 350a is provided in a ring shape having a first inner peripheral surface 354a and a first outer peripheral surface 352a. The first inner peripheral surface 354a corresponds to a surface which is in contact with the outer peripheral surface of the power input shaft 310 and the first outer peripheral surface 352a corresponds to a surface which is in contact with the inner peripheral surface of the rotor shaft 130.

The first inner peripheral surface 354a is provided as a predetermined friction surface. The friction surface may be understood as a surface coated with a material having a small coefficient of friction. For example, the first inner peripheral surface 354a may be formed by coating a hard carbon film having a small friction coefficient.

Also, the first outer peripheral surface 352a may be in close contact with the inner peripheral surface of the rotor shaft 130. Accordingly, the first implementation bearing 350a may be rotated together with the rotor shaft 130. In addition, the power input shaft 310 and the first implementation bearing 350a may be relatively rotated as the power input shaft 310 contacts the first inner peripheral surface 354a.

In other words, as the power input shaft 310 and the first implementation bearing 350a rotate relative to each other through the friction surface, friction can be reduced and interference can be prevented. Accordingly, the first implementation bearing 350a can support the power input shaft 310 in a rotatable manner.

In summary, the first implementation bearing 350a may be provided with a bush having a friction surface. In other words, the vibration reduction bearing 350 may include a bush.

Referring to FIG. 17(b), the second implementation bearing 350b is provided in a ring shape having a second inner peripheral surface 354b and a second outer peripheral surface 352b. The second inner peripheral surface 354b corresponds to a surface which is in contact with the outer peripheral surface of the power input shaft 310 and the second outer peripheral surface 352b corresponds to a surface which is in contact with the inner peripheral surface of the rotor shaft 130.

A predetermined roller is provided on the second inner peripheral surface 354b. In detail, a plurality of elongated needle-shaped rollers may be disposed along the second inner peripheral surface 354b. Such a roller can reduce the contact area with the contact surface, rotate, and reduce the friction.

In addition, the first outer peripheral surface 352b may be in close contact with the inner peripheral surface of the rotor shaft 130. Thus, the second implementation bearing 350b may be rotated together with the rotor shaft 130. The power input shaft 310 and the second implementation bearing 350b may be relatively rotated as the power input shaft 310 contacts the second inner peripheral surface 354b.

In other words, as the power input shaft 310 and the second implementation bearing 350b rotate relative to each other through a plurality of rollers, friction can be reduced and interference can be prevented. Accordingly, the second implementation bearing 350b can support the power input shaft 310 in a rotatable manner.

In summary, the second implementation bearing 350b may be a roller bearing with a plurality of rollers. In particular, the second implementation bearing 350b may be provided as a needle bearing having a narrow and long roller. In other words, the vibration reduction bearing 350 may include a needle bearing.

Thus, the vibration reduction bearing 350 is disposed between the power input shaft 310 and the rotor shaft 130 to rotatably support the power input shaft 310. In particular, the vibration reduction bearing 350 is disposed between the power input shaft 310 and the rotor shaft 130 in the radial direction.

In addition, the vibration reduction bearing 350 is disposed between the differential gear case 310 and the carrier 230 in the axial direction. This corresponds to a natural position for the vibration reduction bearing 350 to be disposed between the power input shaft 310 and the rotor shaft 130.

The vibration reduction bearing 350 may be disposed closer to the differential gear case 310 than the carrier 230. In other words, the vibration reduction bearing 350 may be disposed adjacent to the free end 312 more than the fixed end 314.

As described above, the power input shaft 310 corresponds to a cantilever shape. Therefore, it is natural that deformation at the free end 312 occurs more greatly in a case where vibration is generated. Therefore, by supporting the power input shaft 310 by disposing the vibration reduction bearing 350 closer to the free end 312, deformation can be more effectively prevented.

Specifically, referring to FIG. 16, the length of the power input shaft 310 in the axial direction is referred to as L. In other words, the axial length from the free end 312 to the fixed end 314 corresponds to L. It can be seen that the vibration reduction bearing 350 is positioned adjacent to the differential gear case 310 from the axial center (L/2 point) of the power input shaft 310.

In addition, referring to FIG. 15, the vibration reduction bearing 350 is disposed between the rotor 120 and the rotor shaft bearing 303. In other words, the vibration reduction bearing 350 is disposed on one side of the rotor 120 in the axial direction and on the other side of the rotor shaft bearing 303 in the axial direction.

Vibration of the power input shaft 310 and the differential gear case 310 can be further prevented by arranging the vibration reduction bearings 350 as described above. In other words, the asymmetric support structure of the differential gear case 310 can be supplemented. Further, deformation of the power input shaft 310 provided with a cantilever can be further prevented.

In addition, in the driving apparatus of an electric vehicle according to the idea of the present disclosure, the ring gear 220 according to the first embodiment and the driving shaft 130 according to the second embodiment may be provided together. In other words, the configurations illustrated in FIGS. 3, 10, and 15 may be combined to form an embodiment.

DESCRIPTION OF REFERENCE NUMERALS

1: driving apparatus
10: driving motor
20: planetary gear unit
103: case extending portion
105: rotor shaft bearing
120: rotor
130: rotor shaft
200: planetary gear
210: sun gear
220: ring gear
222: ring gear main body
224: ring gear connection portion
230: carrier
310: power input shaft
312: first end (fixed end)
314: second end (free end)
320: differential gear case
330: differential shaft
350: vibration reduction bearing

What is claimed is:

1. A driving apparatus for an electric vehicle comprising:
a housing;
a driving motor located inside the housing, the driving motor comprising a rotor, a stator, and a rotor shaft connected with the rotor; and
a planetary gear unit located inside the housing and disposed on one side of the driving motor,
a rotor shaft bearing rotatably supporting the rotor shaft on a radially outer side of the rotor shaft,
wherein the planetary gear unit includes
a ring gear fixed to the housing; and
a plurality of planetary gears disposed rotatably on a radially inner side of the ring gear, and
wherein the ring gear includes
a ring gear main body configured as a ring-shaped flat plate extending in the radial direction; and
a ring gear connection portion extending axially from an outer peripheral surface of the ring gear main body and contacting the plurality of planetary gears,
wherein the housing includes a case extending portion extending inward in the radial direction, and
the ring gear main body and the rotor shaft bearing are disposed in contact with each other with the rotor shaft bearing being fixed by the case extending portion and the ring gear.

2. The driving apparatus for an electric vehicle according to claim 1,
wherein the planetary gear unit further includes
a carrier connected to the plurality of planetary gears and configured to transfer a driving force of the plurality of planetary gears to a differential gear unit,
wherein the carrier includes
a carrier main body configured in the form of a ring-shaped flat plate extending in a radial direction, and
wherein the outer diameter of the ring gear main body is larger than the outer diameter of the carrier main body.

3. The driving apparatus for an electric vehicle according to claim 2,
wherein the ring gear further includes
a ring gear penetrating opening defined through the ring gear main body and configured to receive a ring gear fastening member inserted through the ring gear penetrating opening and coupled with the housing, and
wherein the ring gear penetrating opening is located radially inward of an outer peripheral surface of the carrier main body.

4. The driving apparatus for an electric vehicle according to claim 1, further comprising:

a rotor;

a rotor shaft extending axially through the rotor and from opposite sides of the rotor;

a differential gear case disposed radially inward of the rotor;

a first differential shaft extending from the differential gear case to one side of the differential gear case in an axial direction, and along a central opening extending axially through the rotor shaft;

a second differential shaft extending from the differential gear case to the other side of the differential gear case in an axial direction, and along the central opening extending axially through the rotor shaft; and a power input shaft supporting the differential gear case in a position spaced apart from the rotor, wherein the power input shaft is disposed between the rotor shaft and the first differential shaft, and wherein an empty space is formed between the rotor shaft and the second differential shaft.

5. The driving apparatus for an electric vehicle according to claim 4, further comprising:

a differential gear located inside the differential gear case;

a first reduction gear disposed on one side of the rotor shaft in an axial direction and coupled with the first differential shaft; and a second reduction gear disposed on the other side of the rotor shaft in an axial direction and coupled with the second differential shaft, wherein the first differential shaft and the second differential shaft are coupled to the differential gear and extend through the differential gear case to the first reduction gear and the second reduction gear, respectively.

6. The driving apparatus for an electric vehicle according to claim 2, wherein the carrier further includes a carrier coupling portion extending from an outer peripheral surface of the carrier main body in an axial direction; and a carrier connection portion extending from an inner peripheral surface of the carrier main body in an axial direction, and wherein the carrier coupling portion and the carrier connection portion extend in different axial directions from each other.

7. The driving apparatus for an electric vehicle according to claim 6, wherein the ring gear connection portion extends in the same direction as the carrier connection portion in the ring gear main body.

8. The driving apparatus for an electric vehicle according to claim 1, wherein the housing includes a motor case, the stator being fixed to the motor case;

a first intermediate cover coupled to one axial side of the motor case, wherein the planetary gear unit is disposed in the first intermediate cover; and a second intermediate cover coupled to an opposite axial side of the motor case, wherein the ring gear main body is coupled to the case extending portion.

9. The driving apparatus for an electric vehicle according to claim 8, wherein one side of the rotor shaft bearing in a radial direction and in an axial direction is seated on the case extending portion and an opposite side of the rotor shaft bearing in an axial direction is supported on the ring gear main body so that the rotor shaft bearing is fixed in between the ring gear main body and the case extending portion.

10. The driving apparatus for an electric vehicle according to claim 9, wherein an inner diameter of the ring gear main body is smaller than an outer diameter of the rotor shaft bearing.

11. The driving apparatus for an electric vehicle according to claim 8, wherein the case extending portion extends inside the housing in a radial direction and divides an inner space of the housing into a first space containing the driving motor and a second space containing the planetary gear unit.

12. The driving apparatus for an electric vehicle according to claim 1, further comprising:

a differential gear unit configured to receive power from the planetary gear unit, wherein the differential gear unit includes a differential gear case disposed in a position spaced apart from the inside of the driving motor; and a power input shaft connecting the planetary gear unit and the differential gear case to each other, and wherein the power input shaft is configured in the form of a cantilever including a free end coupled to the differential gear case and a fixed end fixedly coupled to the planetary gear unit.

13. The driving apparatus for an electric vehicle according to claim 12, wherein the driving motor includes a rotor and a rotor shaft, wherein the power input shaft extends along an inside of the rotor shaft, and wherein the differential gear unit further includes a vibration reduction bearing disposed between the rotor shaft and the power input shaft.

14. The driving apparatus for an electric vehicle according to claim 13, wherein the vibration reduction bearing is disposed closer to the free end than the fixed end.

15. A driving apparatus comprising:

a motor case in which a stator and a rotor are disposed;

a rotor shaft coupled to the rotor and extending to one side;

a rotor shaft bearing rotatably supporting the rotor shaft;

a case extending portion extending from the motor case so that the rotor shaft bearing is seated on the case extending portion;

a ring gear coupled to the case extending portion to fix the rotor shaft bearing; and a plurality of planetary gears disposed rotatably between the ring gear and a sun gear coupled to the outside of the rotor shaft, wherein the ring gear includes a ring gear main body coupled to the case extending portion in contact with the rotor shaft bearing; and a ring gear connection portion extending from the ring gear main body and contacting the plurality of planetary gears, and the ring gear main body and the rotor shaft bearing are disposed in contact with each other with the rotor shaft bearing being fixed by the case extending portion and the ring gear.

16. The driving apparatus according to claim 15,
wherein the ring gear main body and the ring gear connection portion are configured perpendicular to each other.

17. The driving apparatus according to claim 16,
wherein the ring gear main body is configured in a ring shape having an inner diameter smaller than an inner diameter of the rotor shaft bearing.

18. The driving apparatus according to claim 17,
wherein the ring gear connection portion extends vertically from an outer diameter of the ring gear main body.

19. The driving apparatus according to claim 16,
wherein the ring gear connection portion is disposed radially outward of the plurality of planetary gears, and
wherein the ring gear main body extends radially inward from one end of the ring gear connection portion.

* * * * *